(12) United States Patent
Ko

(10) Patent No.: US 12,323,096 B2
(45) Date of Patent: Jun. 3, 2025

(54) MICRO INVERTER FOR PHOTOVOLTAIC POWER GENERATION AND PHOTOVOLTAIC POWER GENERATION SYSTEM USING THE SAME AND PHOTOVOLTAIC MODULE ARRAY INTEGRATED THE SAME

(71) Applicant: Lotte Energy Co., Ltd., Paju-si (KR)

(72) Inventor: Ki Hun Ko, Seoul (KR)

(73) Assignee: LOTTE ENERGY CO., LTD. (KR)

( * ) Notice: Subject to any disclaimer, the term of this patent is extended or adjusted under 35 U.S.C. 154(b) by 581 days.

(21) Appl. No.: 17/617,929

(22) PCT Filed: Feb. 1, 2021

(86) PCT No.: PCT/KR2021/001270
§ 371 (c)(1),
(2) Date: Dec. 9, 2021

(87) PCT Pub. No.: WO2022/163884
PCT Pub. Date: Aug. 4, 2022

(65) Prior Publication Data
US 2023/0155547 A1    May 18, 2023

(51) Int. Cl.
*H02S 40/34* (2014.01)
*H02J 3/38* (2006.01)

(52) U.S. Cl.
CPC ............ *H02S 40/34* (2014.12); *H02J 3/381* (2013.01); *H02J 2300/26* (2020.01)

(58) Field of Classification Search
CPC .......... H02S 40/34; H02S 40/22; H02S 40/32; H02S 40/42; H02J 3/381; H02J 2300/26; Y02E 10/56; G05F 1/67; H02M 7/00
See application file for complete search history.

(56) References Cited

U.S. PATENT DOCUMENTS

| 5,951,785 | A | * | 9/1999 | Uchihashi | F24S 25/67 136/246 |
|---|---|---|---|---|---|
| 2009/0000654 | A1 | * | 1/2009 | Rotzoll | H02J 3/388 136/244 |
| 2011/0240088 | A1 | * | 10/2011 | Ecob | H02S 40/34 174/59 |
| 2014/0369098 | A1 | | 12/2014 | Li | |
| 2015/0098251 | A1 | | 4/2015 | Harrison | |
| 2015/0144181 | A1 | * | 5/2015 | Gilchrist | H05K 3/301 136/251 |
| 2015/0188486 | A1 | * | 7/2015 | Marroquin | H02S 40/32 361/752 |
| 2015/0311788 | A1 | | 10/2015 | Nandi et al. | |

(Continued)

FOREIGN PATENT DOCUMENTS

| KR | 101063208 B1 | 9/2011 |
| KR | 102172004 B1 | 10/2020 |

*Primary Examiner* — Michael Y Sun
(74) *Attorney, Agent, or Firm* — Renaissance IP Law Group LLP

(57) ABSTRACT

A microinverter for photovoltaic power generation includes a photovoltaic power generation system using the same, and a solar cell panel array integrated with the microinverter for photovoltaic power generation. The microinverter for photovoltaic power generation may include a case lower plate formed in a plate shape; a case cover configured to cover the case lower plate; and a substrate installed on the case lower plate.

9 Claims, 22 Drawing Sheets

(56) References Cited

U.S. PATENT DOCUMENTS

2017/0063094 A1    3/2017  Chapman et al.
2017/0366135 A1*  12/2017  Forrest ................ H01L 31/1896
2021/0226364 A1*   7/2021  Khaligh ............... H01R 12/724

* cited by examiner

205: Heat sink fin

MICRO INVERTER FOR PHOTOVOLTAIC POWER GENERATION AND PHOTOVOLTAIC POWER GENERATION SYSTEM USING THE SAME AND PHOTOVOLTAIC MODULE ARRAY INTEGRATED THE SAME

TECHNICAL FIELD

The present disclosure relates to a microinverter for photovoltaic power generation, a photovoltaic power generation system using the same, and a solar cell panel array integrated with the microinverter for photovoltaic power generation, and more specifically, to a microinverter for photovoltaic power generation, a photovoltaic power generation system using the same, and a solar cell panel array integrated with the microinverter for photovoltaic power generation, in which the microinverter is allowed to be easily attached to and detached from individual solar cell panels to facilitate maintenance of the microinverter, and performs Maximum Power Point Tracking (MPPT).

BACKGROUND ART

A photovoltaic (PV) power generation system is a system that converts sunlight into electric energy, and since there is no mechanical or chemical actions in the energy conversion process and thus the system structure is simple, its maintenance is simple, the lifespan is long as much as about 20 to 30 years, and it is environmentally friendly.

In addition, as the power generation scale may be diverse from a small capacity system of several kW to a large capacity system of several hundreds of kW, the photovoltaic power generation system attracts attention in the field of new and renewable energy.

In order to transmit power produced by the photovoltaic power generation to a system, a power converter capable of converting direct current to alternating current and tracking the maximum power operating voltage of a solar cell panel is required. The power converter may include a front-end DC-DC converter and a back-end DC-AC inverter.

Conventional photovoltaic power generation systems have a problem in that as several solar cell panels are connected to one power controller to reduce manufacturing cost, when generation of photovoltaic power is reduced in a plurality of solar cell panels, the total amount of power generation of the power controller abruptly decreases, and photovoltaic power generation systems integrated in a building, i.e., building integrated photovoltaic (BIPV) which attracts attention recently, have a more serious problem of decreasing power generation efficiency due to a partial shading phenomenon.

Accordingly, a new type of small inverters that install one inverter per solar cell module is applied recently. A new technique that emerges in the solar power inverter market, mainly in the US market, is the microinverter. The microinverter is not a centralized system that converts electricity collected by a solar cell panel array from direct current to alternating current, but a distributed system that converts direct current to alternating current in units of modules by installing an inverter in each individual solar cell panel (or each individual solar cell module).

However, even the distributed system has a problem in that since it is not easy to attach or detach an inverter by attaching the inverter as a power controller on the rear surface of a solar cell panel by performing silicon bonding, it is not easy to repair or replace a broken inverter.

DISCLOSURE

Technical Problem

Therefore, the present inventive concept has been made in view of the above problems, and it is an object of the present inventive concept to provide a microinverter for photovoltaic power generation, a photovoltaic power generation system using the same, and a solar cell panel array integrated with the microinverter for photovoltaic power generation, in which the problems of partial shading and device aging can be improved as each individual module has a maximum power point tracking (MPPT) control function, and maintenance such as repair, replacement or the like of an inverter can be easily performed by allowing the inverter to be easily attached to and detached from a solar cell panel.

Technical Solution

To accomplish the above object, according to one aspect of the present inventive concept, there is provided a microinverter for photovoltaic power generation, the microinverter comprising: a case lower plate formed in a plate shape; a case cover configured to cover the case lower plate; and a substrate installed on the case lower plate.

In addition, the substrate includes: a first conductor connected to a first solar cell module in parallel; a second conductor connected to a second solar cell module in parallel; a first switch connected to the first solar cell module and the first conductor in parallel; a second switch connected to the second solar cell module and the second conductor in parallel; a shuffling inductor connected between the first and second conductors and the first and second switches; a boost inductor connected to the first solar cell module, the first conductor, and the first switch; a third switch connected to the boost inductor, the second solar cell module, the second conductor, and the second switch; and an MPPT control unit for controlling operation of tracking a maximum power point on the basis of respective voltages of the first solar cell module and the second solar cell module, wherein the MPPT control unit may operate the first switch, the second switch, and the third switch.

In addition, the MPPT control unit may include: an MTTP unit for tracking a maximum power point on the basis of respective voltages of the first solar cell module and the second solar cell module; and a voltage adjustment unit for adjusting an output voltage of the MTTP unit.

In addition, the first switch and the second switch may operate on the basis of the output voltage of the MPPT unit, and the third switch may operate on the basis of an output voltage of the voltage adjustment unit.

In addition, the microinverter may further comprise: a DC voltage device connected to the third switch in parallel; and a rectifying device connected between the third switch and the DC voltage device.

In addition, a heat sink may be formed on a surface of the case cover.

In addition, the heat sink may be made of heat sink fins.

To accomplish the above object, there is provided a microinverter for photovoltaic power generation, the microinverter comprising: a fixed panel attached to a rear surface of a solar cell panel; and a detachable microinverter unit attached to and detached from the fixed panel by screw-coupling.

In addition, the fixed panel may be configured to include: a solar cell wire through hole formed for a solar cell wire, which draws out power of the solar cell panel, to pass through; and a plurality of fixing panel nut units formed in an edge area in a cylindrical column shape having a female screw to which a screw is coupled to fix the fixed panel by screw-coupling.

The detachable microinverter unit may be configured to include: an inverter box attached to and detached from the fixed panel by screw-coupling as a plurality of double nut units is formed along an edge; a substrate mounted inside the inverter box; and an inverter box cover that covers the inverter box.

To accomplish the above object, there is provided a solar cell panel array integrated with a microinverter for photovoltaic power generation, the inverter comprising: the microinverter for photovoltaic power generation; and one or more solar cell panels respectively having a microinverter integrally formed therein, wherein the solar cell panels are connected in parallel by the microinverters for photovoltaic power generation.

The solar cell panel may be configured to include a pair of first and second solar cell modules.

To accomplish the above object, there is provided a photovoltaic power generation system using a microinverter for photovoltaic power generation, the system comprising: the microinverter for photovoltaic power generation, a solar cell panel having a plurality of solar cell modules installed therein, and a support installed on a rear surface of the solar cell panel to support the solar cell panel, wherein the microinverter for photovoltaic power generation includes: a case lower plate formed in a plate shape; a case cover configured to cover the case lower plate; and a substrate installed on the case lower plate, wherein the substrate includes: a first conductor connected to a first solar cell module in parallel; a second conductor connected to a second solar cell module in parallel; a first switch connected to the first solar cell module and the first conductor in parallel; a second switch connected to the second solar cell module and the second conductor in parallel; a shuffling inductor connected between the first and second conductors and the first and second switches; a boost inductor connected to the first solar cell module, the first conductor, and the first switch; a third switch connected to the boost inductor, the second solar cell module, the second conductor, and the second switch; and an MPPT control unit for controlling operation of tracking a maximum power point on the basis of respective voltages of the first solar cell module and the second solar cell module, wherein the MPPT control unit operates the first switch, the second switch, and the third switch.

Advantageous Effects

The microinverter for photovoltaic power generation, the photovoltaic power generation system using the same, and the solar cell panel array integrated with the microinverter for photovoltaic power generation according to the present inventive concept provide an effect of remarkably facilitating maintenance of the microinverter and significantly reducing maintenance cost and time by allowing the microinverter to be easily attached to and detached from each individual solar cell panel.

In addition, the microinverter for photovoltaic power generation and the solar cell panel array integrated with the microinverter for photovoltaic power generation according to the present inventive concept provide an effect of minimizing degradation of power generation efficiency when sunlight is not radiated on some solar cell panels due to a shade or the like as the solar cell panels, of which the power generation efficiency has been lowered due to the shade or the like, do not affect power generation efficiency of the entire solar cell panel array by connecting the solar cell panels in parallel through the microinverters for photovoltaic power generation.

In addition, the microinverter for photovoltaic power generation is affected by the power conversion efficiency only as much as a difference in power at the maximum power point between the solar cell modules, not affected by the power conversion efficiency of the total power of the solar cell modules. Therefore, the microinverter for photovoltaic power generation and the solar cell panel array integrated with the microinverter for photovoltaic power generation according to the present inventive concept have an effect of ultimately increasing conversion efficiency in the entire system.

In addition, the photovoltaic power generation system using the microinverter for photovoltaic power generation can be directly coupled to a solar cell panel and a support, and has an effect of easily coupling the same.

DESCRIPTION OF SYMBOLS

Figure 1:
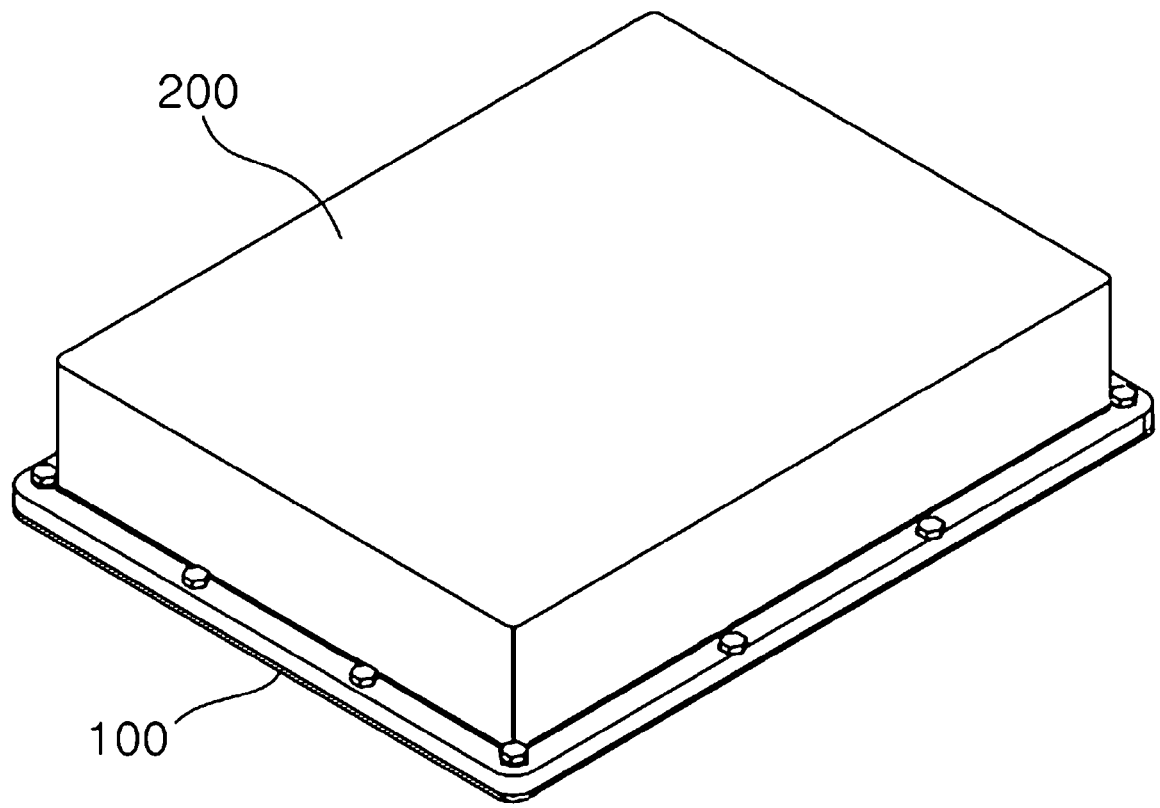
FIG. 1 is a perspective view showing a microinverter for photovoltaic power generation according to an embodiment of the present inventive concept.

| | |
|---|---|
| 1: Solar cell panel array | |
| 5: Bus wire | |
| 10: Microinverter for solar power generation | |
| 20: Solar cell panel, solar cell plate | |
| 21: First solar cell module | |
| 23: Second solar cell module | 30: Support |
| 100: Case lower plate | 100': Fixed panel |
| 101: Adhesive (silicon bond) | 110: Extended insertion unit |
| 120: Hinge-coupling unit | 130: Fixing panel nut unit |
| 140: Solar cell wire through hole | 180: Solar cell wire |
| 190: Inverter terminal socket unit | 191: Inverter terminal socket substrate |
| 193: Inverter terminal socket | 200: Case cover |
| 200': Detachable microinverter unit | 201: Inverter box cover |
| 202: Cover flange | 210: Heat sink paint layer |
| 211: Paint | 212: Protrusion |
| 213, 220: Self-assembled particle | 230, 215: Heat sink particle |
| 220': Inverter box | 221: LED unit |
| 223: Communication antenna | 225: AC output port |
| 230': Double nut unit | 231: Cover nut unit |
| 233: Fixing flange | 234: Through hole |
| 235: Substrate mounting nut unit | 250, 253: Near field communication unit |
| 255: AC output port | 290: Inverter terminal socket unit through hole |
| 293: Inverter terminal | 300, 700: Substrate |
| 310: First conductor | 320: Second conductor |
| 330: First switch | 340: Second switch |
| 350: Shuffling inductor | 360: Boost inductor |
| 370: Third switch | 380: DC voltage device |
| 390: Rectifying device | 410: First solar cell module |
| 420: Second solar cell module | S: Screw |

DETAILED DESCRIPTION

In describing the present inventive concept below, when it is determined that the detailed description of a related well-known function or configuration may unnecessarily obscure the gist of the present inventive concept, the detailed description thereof will be omitted.

Since the embodiments according to the concept of the present inventive concept may make various changes and have various forms, specific embodiments will be illustrated in the drawings and described in detail in this specification or application. However, it should be understood that this is not intended to limit the embodiments according to the concept of the present inventive concept to specific disclosed forms, and the present inventive concept includes all changes, equivalents and substitutes included in the spirit and scope of the present inventive concept.

When a component is referred to as being "connected" or "coupled" to another component, it should be understood that the component may be directly connected or coupled to another component, but other components may exist therebetween. On the other hand, when a component is referred to as being "directly connected" or "directly coupled" to another component, it should be understood that no other components exist therebetween. Other expressions describing the relationship between components such as "between" and "immediately between" or "adjacent to" and "directly adjacent to", and the like should be interpreted in the same way.

The terms used in this specification are used only to describe specific embodiments, and are not intended to limit the present inventive concept. A singular expression includes a plural expression unless the context clearly dictates otherwise. It should be understood that in this specification, the terms such as "comprise" or "have" are intended to designate presence of embodied features, numbers, steps, operations, components, parts, or a combination thereof, and do not preclude in advance the possibility of presence or addition of one or more other features, numbers, steps, operations, components, parts, or a combination thereof.

Hereinafter, a microinverter for photovoltaic power generation according to the present inventive concept will be described in detail with reference to the drawings.

Figure 2:
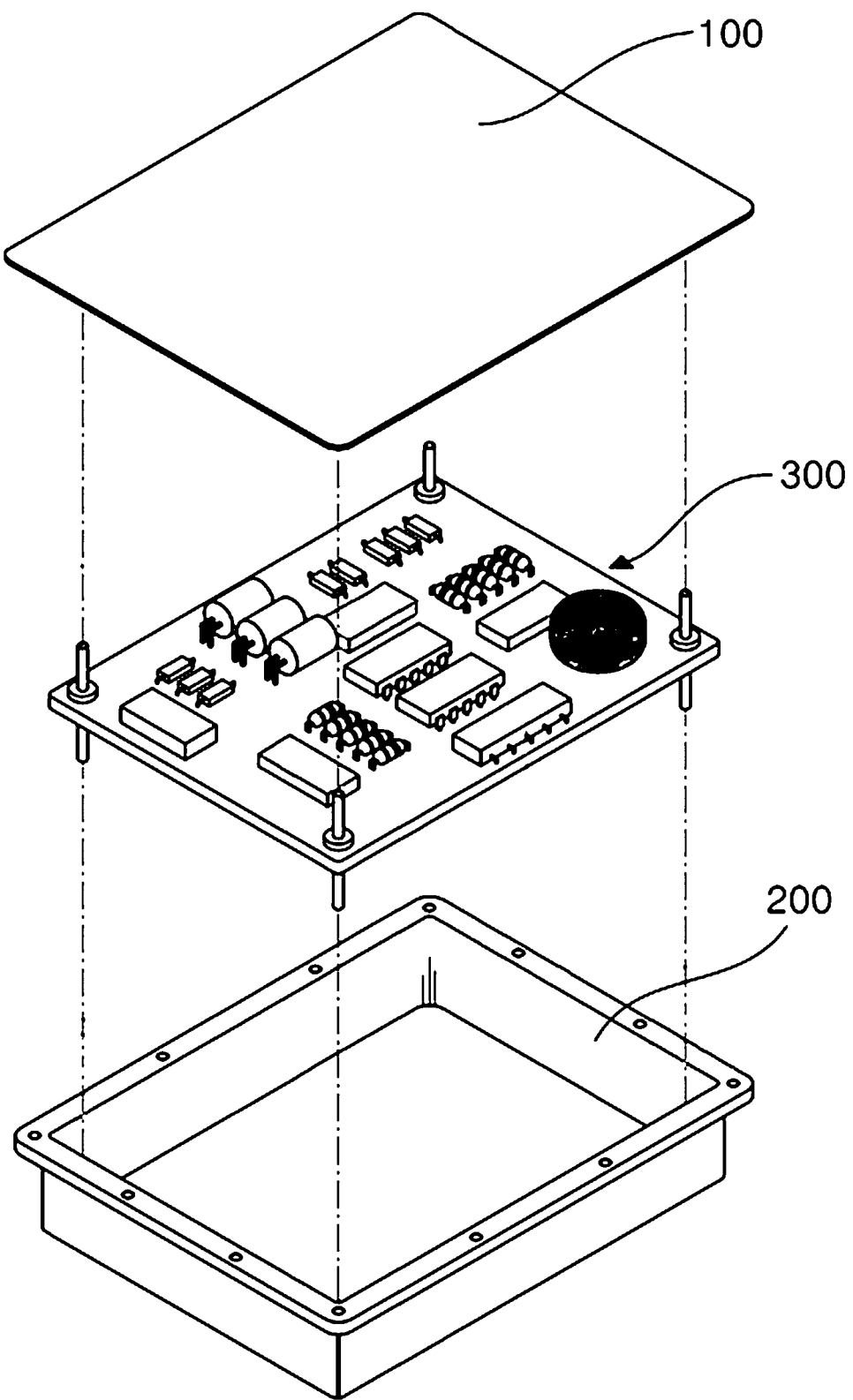
FIG. 2 is an exploded perspective view showing a microinverter for photovoltaic power generation according to an embodiment of the present inventive concept.
Figure 3:
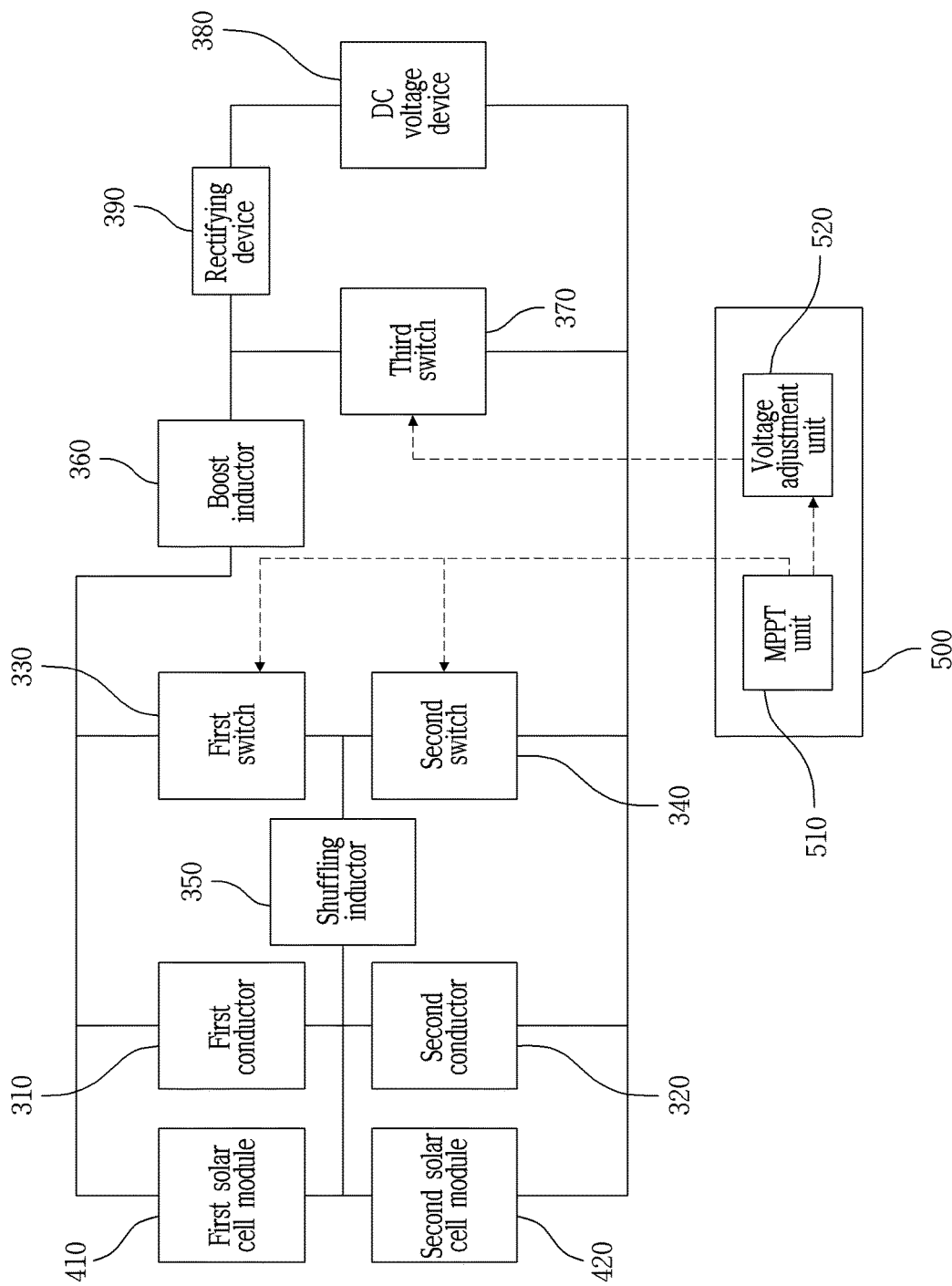
FIG. 3 is a view schematically showing a substrate of a microinverter for photovoltaic power generation according to an embodiment of the present inventive concept.

FIG. 1 is a perspective view showing a microinverter for photovoltaic power generation according to an embodiment of the present inventive concept, FIG. 2 is an exploded perspective view showing a microinverter for photovoltaic power generation according to an embodiment of the present inventive concept, and FIG. 3 is a view schematically showing a substrate of a microinverter for photovoltaic power generation according to an embodiment of the present inventive concept.

First, referring to FIGS. 1 and 2, a microinverter for photovoltaic power generation according to an embodiment of the present inventive concept is configured to include a case lower plate 100 formed in a plate shape; a case cover 200 configured to cover the case lower plate 100; and a substrate 300 installed on the case lower plate 100.

Referring to FIG. 3, the substrate 300 is configured to include a first conductor 310 connected to a first solar cell module 410 in parallel; a second conductor 320 connected to a second solar cell module 420 in parallel; a first switch 330 connected to the first solar cell module 410 and the first conductor 310 in parallel; a second switch 340 connected to the second solar cell module 420 and the second conductor 320 in parallel; a shuffling inductor 350 connected between the first and second conductors 310 and 320 and the first and second switches 330 and 340; a boost inductor 360 connected to the first solar cell module 410, the first conductor 310, and the first switch 330; a third switch 370 connected to the boost inductor 360 and also connected to the second solar cell module 420, the second conductor 320, and the second switch 340; and an MPPT control unit 500 for controlling operation of tracking a maximum power point on the basis of respective voltages of the first solar cell module 410 and the second solar cell module 420.

In addition, at this point, it may be configured to operate the first switch 330, the second switch 340, and the third switch 370 by the MPPT controller. The MPPT (Maximum Power Point Tracking) means tracking a maximum power point, which is widely used in photovoltaic power generation recently.

The MPPT may obtain maximum power by appropriately adjusting the load according to external conditions. The point at which the maximum power is transmitted is called as a maximum power operating point, and the maximum power operating point changes according to external conditions such as solar radiation, temperature, and the like.

In the present inventive concept, MPPT control is performed by the MPPT control unit 500, and as an MPPT control method, there is a Perturb & Observe (P&O) method. The P&O method is a method of finding the maximum power operating point by periodically increasing and decreasing the output voltage of the solar cell module and comparing previous output power with current output power. The P&O method has an advantage in that there is no loss of solar cells as the maximum power point is stable in a situation where solar radiation gradually changes.

Additionally, a solar junction box including bypass diodes may be installed in the first conductor 310 and the second conductor 320 of the microinverter for photovoltaic power generation according to an embodiment of the present inventive concept. The solar junction box may prevent reverse current caused by an abrupt change in sunlight. In other words, the solar junction box may prevent damage to the solar cell panel.

In summary, the solar junction box may perform the function of a junction box mounted on an existing solar cell module.

In the present inventive concept, as shown in FIG. 3, the substrate 300 may be configured to include a first conductor 310 connected to a first solar cell module 410 in parallel; a second conductor 320 connected to a second solar cell module 420 in parallel; a first switch 330 connected to the first solar cell module 410 and the first conductor 310 in parallel; a second switch 340 connected to the second solar cell module 420 and the second conductor 320 in parallel; a shuffling inductor 350 connected between the first and second conductors 310 and 320 and the first and second switches 330 and 340; a boost inductor 360 connected to the first solar cell module 410, the first conductor 310, and the first switch 330; a third switch 370 connected to the boost inductor 360 and also connected to the second solar cell module 420, the second conductor 320, and the second switch 340; and an MPPT control unit 500 for controlling operation of tracking a maximum power point on the basis of respective voltages of the first solar cell module 410 and the second solar cell module 420.

In addition, the substrate may be configured to include a DC voltage device 380 connected to the third switch 370 in parallel; and a rectifying device 390 connected between the third switch 370 and the DC voltage device 380.

FIG. 4 is an exemplary view showing implementation of a microinverter substrate for photovoltaic power generation according to an embodiment of the present inventive concept, and the configuration of the substrate 300 as described above may be implemented as shown in FIG. 4.

In the present inventive concept, the substrate 300 operates in a buck mode or a boost mode, and determines a voltage duty ratio of the first solar cell module 410 and the second solar cell module 420. At this point, the buck mode or the boost mode of the substrate 300 is determined according to the direction of inductor current $I_{shuff}$ of FIG. 4. For reference, it means that the output voltage is lower than the input voltage when the substrate 300 operates in the buck mode, and the output voltage is higher than the input voltage when the substrate 300 operates in the boost mode.

In the present inventive concept, the sum of the voltages of the first solar cell module 410 and the second solar cell module 420, i.e., the sum of voltage PV1 and voltage PV2, becomes the input voltage. In the present inventive concept, the maximum power point may be tracked by adjusting deviation of current with a differential power, and since voltage fluctuation in the first solar cell module 410 affects the second solar cell module 420, the sum of the voltages of the first solar cell module 410 and the second solar cell module 420 becomes the input voltage.

In addition, in the present inventive concept, after sensing the voltage and current values of the first solar cell module 410 and the second solar cell module 420, the maximum power points of the first solar cell module 410 and the second solar cell module 420 may be calculated in the P&O method, and the duty ratio of the first solar cell module 410 and the second solar cell module 420 may be determined through a direct-duty ratio technique. In addition, the command voltage of all solar cell modules including the first solar cell module 410 and the second solar cell module 420 may be applied to $V_{dc}$.

In addition, in the microinverter for photovoltaic power generation according to the present inventive concept, the MPPT control unit 500 may be configured to include an MPPT unit 510 for tracking the maximum power point on the basis of respective voltages of the first solar cell module 410 and the second solar cell module 420; and a voltage adjustment unit 520 for adjusting the output voltage of the MTTP unit 510.

In addition, at this point, the first switch 330 and the second switch 340 may be configured to operate on the basis of the output voltage of the MPPT unit 510, and the third switch 370 may be configured to operate on the basis of the output voltage of the voltage adjustment unit 520.

Here, $V_{con}$, which is the output voltage of the MPPT unit 510, may be expressed as shown in [Equation 1].

$$V_{con} = PV1\_ref * \frac{1}{PV1\_ref + PV2\_ref} \qquad \text{[Equation 1]}$$

Figure 4:
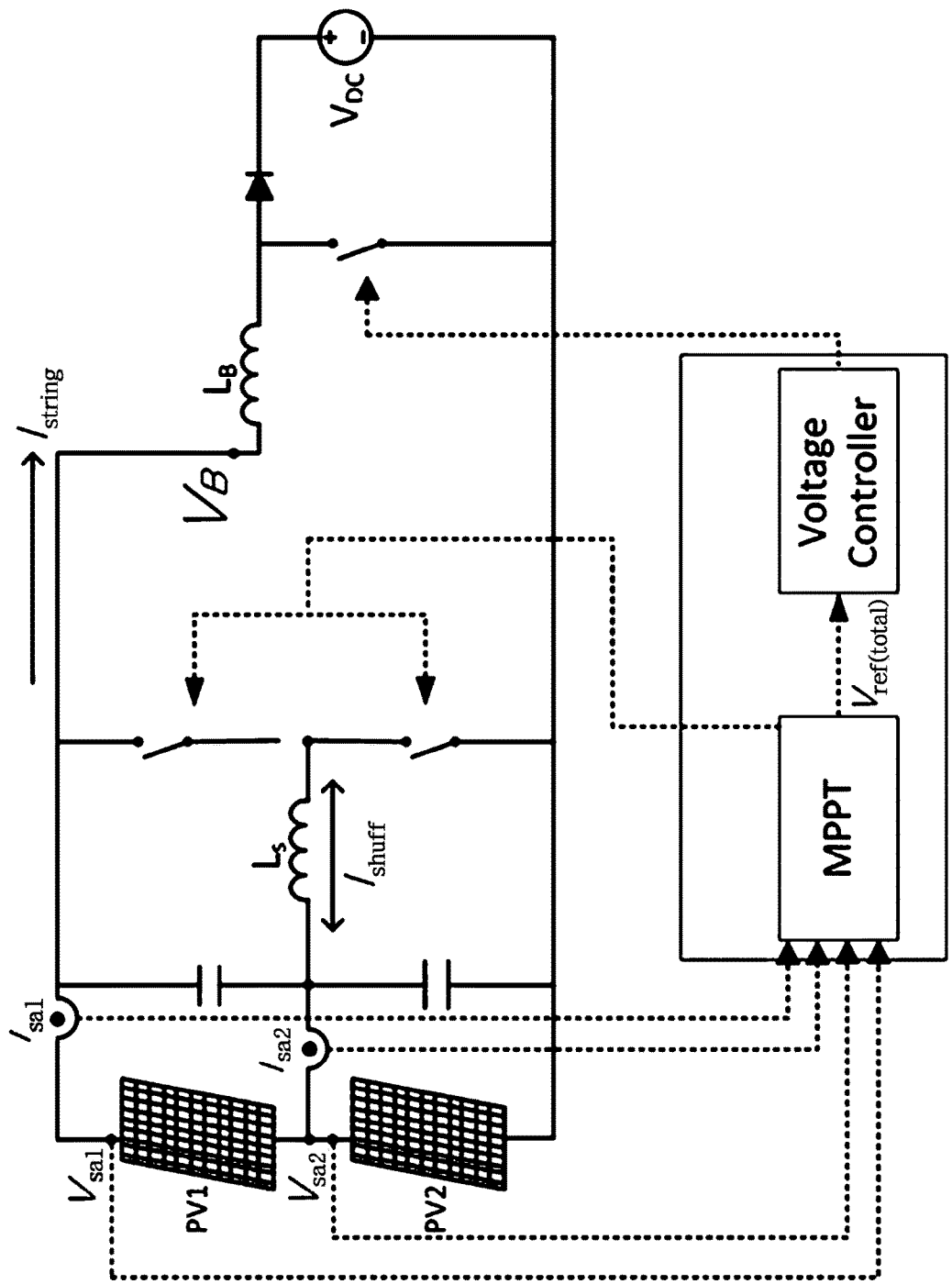
FIG. 4 is an exemplary view showing implementation of a microinverter substrate for photovoltaic power generation according to an embodiment of the present inventive concept.

For reference, in FIG. 4, $V_B$ is the boost input voltage, $I_{string}$ is the main string current, $V_{dc}$ is the DC link, $L_S$ is the inductance of the shuffling inductor 350, and $L_B$ is the inductance of the boost inductor 360.

As the substrate 300 is configured as described above, the microinverter for photovoltaic power generation according to the present inventive concept may endure of power an amount smaller than that of a conventional photovoltaic inverter that endures output of all the solar cell modules. That is, since the microinverter of the present inventive concept is affected by the power conversion efficiency only as much as a difference in power at the maximum power point between the solar cell modules, not affected by the power conversion efficiency of the total power of the solar cell modules, the conversion efficiency in the entire system finally increases.

Figure 21:
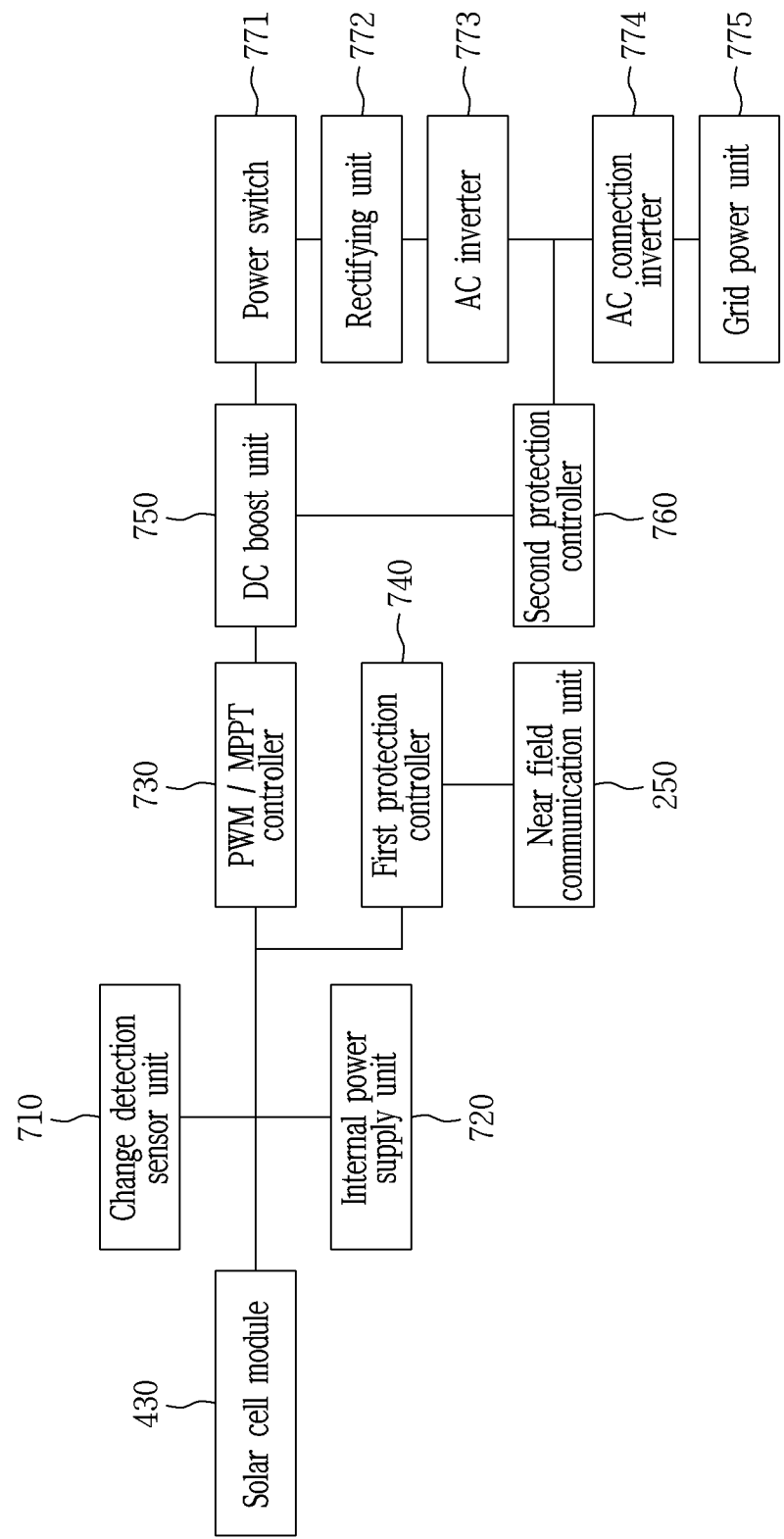
FIG. 21 is a view schematically showing a substrate of a microinverter for photovoltaic power generation according to an embodiment of the present inventive concept.
Figure 22:
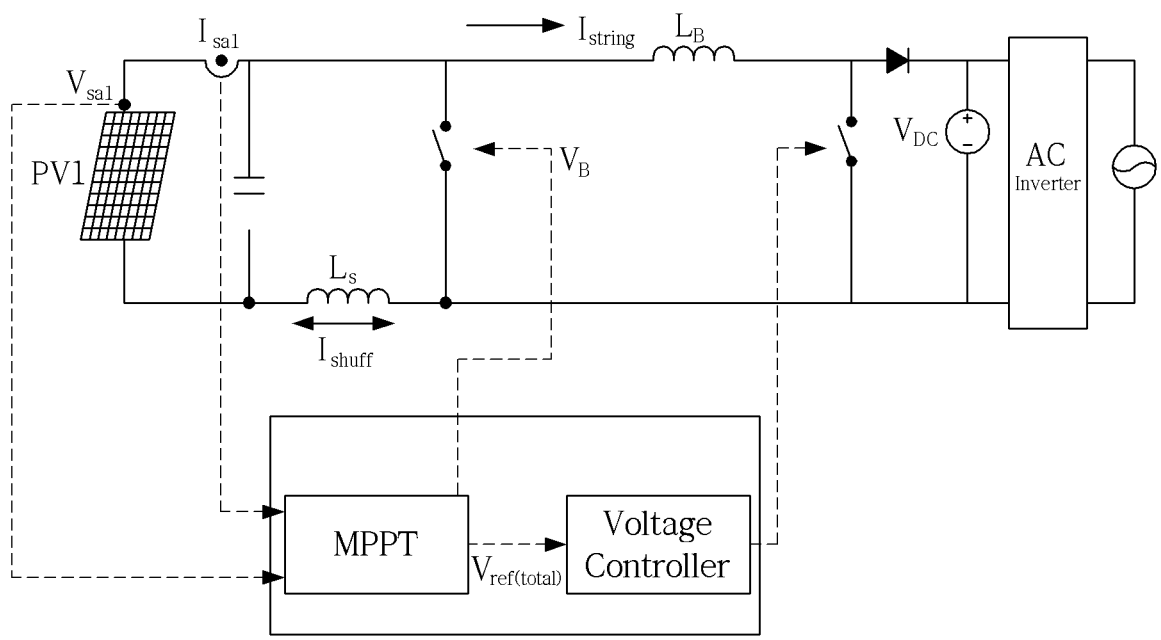
FIG. 22 is an exemplary view showing implementation of a microinverter substrate for photovoltaic power generation according to an embodiment of the present inventive concept.

Additionally, referring to FIGS. 21 and 22, in the microinverter for photovoltaic power generation according to the present inventive concept, the substrate 700 may be connected to one solar cell module 430.

Describing in more detail, the substrate 700 may be configured to include a change detection sensor unit 710, an internal power supply unit 720, a PWM/MPPT controller 730, a first protection controller 740, a near field communication unit 250, a DC boost unit 750, a second protection controller 760, and an AC inverter unit 770.

The change detection sensor unit 710 may be connected to the solar cell module 430 to check the state of the solar cell module 430 at all times. In addition, the change detection sensor unit 710 may recognize a short circuit of the input of the solar cell module 430, measure a voltage value, and measure a temperature or the like of the surrounding environment.

The internal power supply unit 720 may supply power of DC 10V, 5V, 3.3V or the like to the change detection sensor unit 710, the PWM/MPPT controller 730, the first protection controller 740, the near field communication unit 250, the DC boost unit 750, the second protection controller 760, and the AC inverter unit 770.

The PWM/MPPT controller 730 may operate a PWM or MPPT function using a P&O algorithm.

The first protection controller 740 may receive measurement values from the change detection sensor unit 710 and protect the solar cell module 430 from damage of external input power.

The near field communication unit 250 may transmit information such as the current state of the microinverter, power production performance and the like to the outside. In addition, when a failure or an error occurs in a solar cell panel 20, the microinverter 10 transmits an identifier for identifying the solar cell panel 20 and information on the type of the failure or error to an external control center, a manager computer, an alarm device, or the like through the near field communication unit, so that the solar cell panel 20 in which the failure or error has occurred may be easily identified and handled.

The DC boost unit 750 may boost DC 50V input from the solar cell module 430 to DC 400V for conversion to AC 220V.

The second protection controller 760 may recognize power failure, disconnection, overvoltage, or the like for protection of the AC inverter unit 770, and stop generation of the microinverter when a problem occurs in an externally connected power source.

The AC inverter unit 770 may convert DC 400V to AC 220V and supply AC 220V to the outside. In addition, the AC inverter unit 770 may include a power switch 771, a rectifying unit 772, an AC inverter 773, an AC connection inverter 774, and a grid power unit 775.

The power switch 771 may be connected to external AC 220V to protect an external circuit (grid) and the AC inverter 773 only when the internal boost of the AC inverter 773 is sufficiently achieved. In other cases, the power switch 771 may be separated from the grid.

The rectifying unit 772 may smooth the DC power boosted to DC 400V into complete and stable DC power for inverting, and supply the complete and stable DC power to the AC inverter 773.

The AC inverter 773 may convert DC 400V to AC 220V.

The AC connection inverter 774 may be used to safely connect AC 220V of the grid to the AC inverter 773.

The grid power unit 775 may be an external part of a meter connected to AC 220V of the grid.

Figure 5:
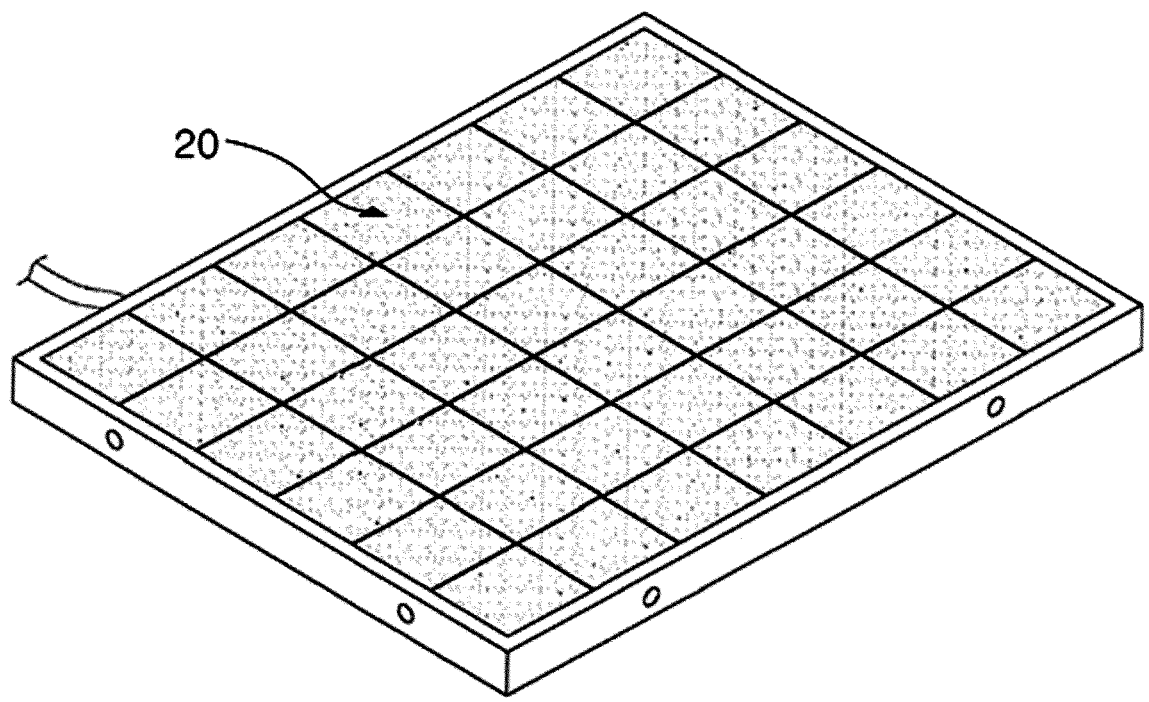
FIGS. 5 and 6 are views showing the configuration of a photovoltaic power generation system using a microinverter for photovoltaic power generation according to an embodiment of the present inventive concept.
Figure 6:
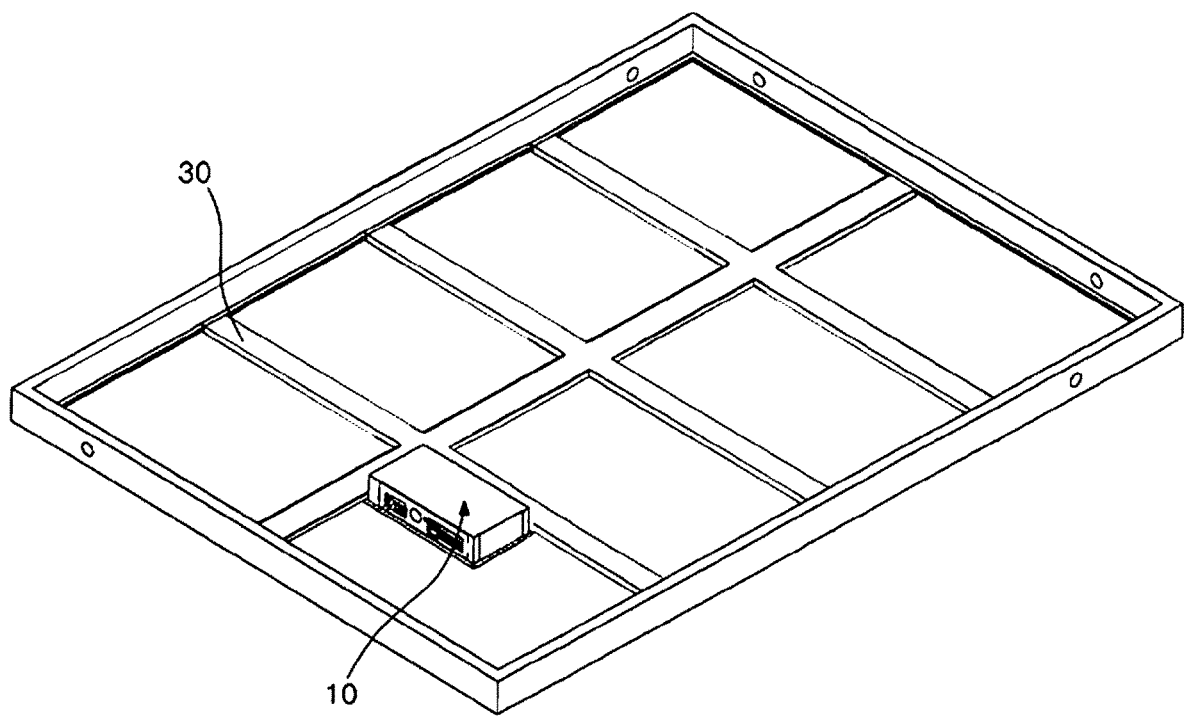
Figure 7:
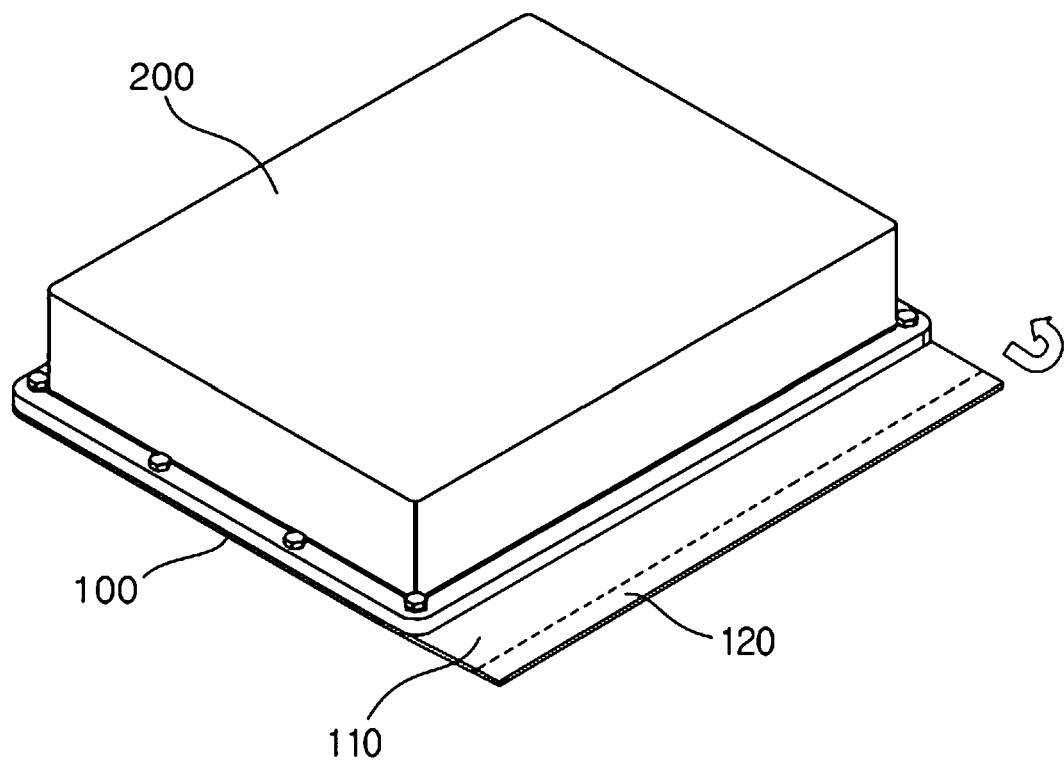
FIG. 7 is a view showing the configuration of a microinverter for photovoltaic power applied to FIG. 6.

FIGS. 5 and 6 are views showing the configuration of a photovoltaic power generation system using a microinverter for photovoltaic power generation according to an embodiment of the present inventive concept, and FIG. 7 is a view showing the configuration of a microinverter for photovoltaic power applied to FIG. 6.

Referring to FIGS. 5 and 6, a photovoltaic power generation system using a microinverter for photovoltaic power generation according to the present inventive concept is configured to include a microinverter 10 for photovoltaic power generation, a solar cell panel 20 having a plurality of solar cell modules installed therein, and a support 30 installed on the rear side of the solar cell panel 20 to support the solar cell panel 20. FIG. 5 shows the front side of the solar cell panel 20, and FIG. 6 shows the back side (rear side) of the solar cell panel 20 and the support 30.

That is, in the photovoltaic power generation system using a microinverter for photovoltaic power generation according to the present inventive concept, the microinverter 10 for photovoltaic power generation is configured to include a case lower plate 100 formed in a plate shape; a case cover 200 configured to cover the case lower plate 100; and a substrate 300 installed on the case lower plate 100. The substrate 300 is configured to include a first conductor 310 connected to a first solar cell module 410 in parallel; a second conductor 320 connected to a second solar cell module 420 in parallel; a first switch 330 connected to the first solar cell module 410 and the first conductor 310 in parallel; a second switch 340 connected to the second solar cell module 420 and the second conductor 320 in parallel; a shuffling inductor 350 connected between the first and second conductors 310 and 320 and the first and second switches 330 and 340; a boost inductor 360 connected to the first solar cell module 410, the first conductor 310, and the first switch 330; and a third switch 370 connected to the boost inductor 360 and also connected to the second solar cell module 420, the second conductor 320, and the second switch 340. In addition, at this point, it may be configured to operate the first switch 330, the second switch 340, and the third switch 370 by the MPPT controller.

In addition, in the present inventive concept, the case lower plate 100 may be configured to include an extended insertion unit 110 extended from the case lower plate 100 toward the outside; and a hinge-coupling unit 120 hinge-coupled to the extended insertion unit 110 to be rotatably installed, so that the extended insertion unit 110 may be insert-coupled between the solar cell panel 20 and one side of the support 30, and the hinge-coupling unit 120 may be rotated and bolt-coupled on the other side of the support 30.

Figure 8:
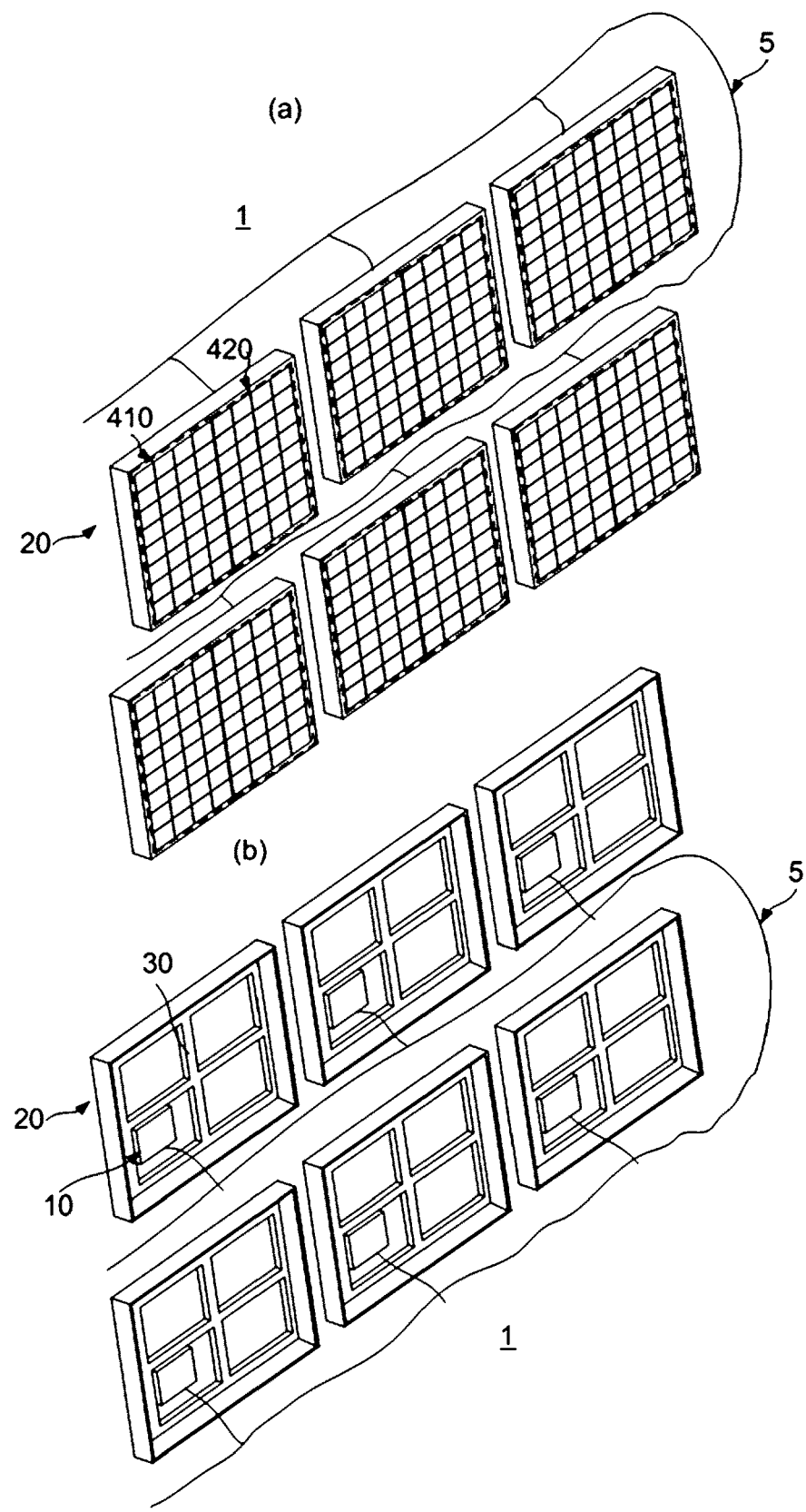
FIG. 8 is a front perspective view (a) and a rear perspective view (b) showing a solar cell panel array 1 integrated with a microinverter for photovoltaic power generation according to an embodiment of the present inventive concept.
Figure 9:
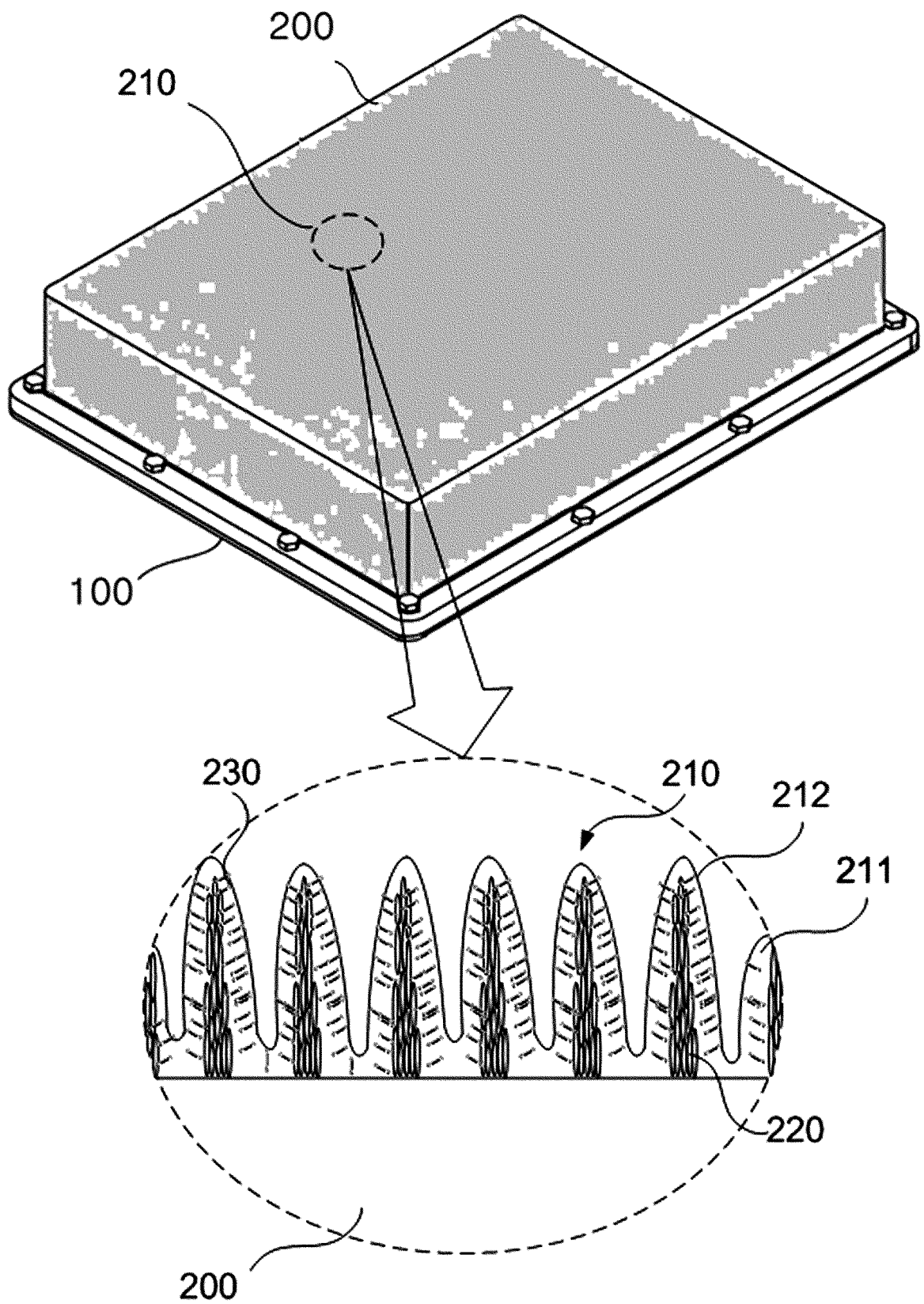
FIG. 9 is a perspective view showing a microinverter for photovoltaic power generation according to an embodiment of the present inventive concept.

FIG. 8 is a front perspective view (a) and a rear perspective view (b) showing a solar cell panel array 1 integrated with a microinverter for photovoltaic power generation according to an embodiment of the present inventive concept, FIG. 9 is a perspective view showing a microinverter for photovoltaic power generation according to an embodiment of the present inventive concept, FIG. 2 is an exploded perspective view showing a microinverter for photovoltaic power generation according to an embodiment of the present inventive concept, and FIG. 3 is a functional block diagram showing up to the front end of a converter performing MPPT control and DC boosting for AC conversion of the microinverter for photovoltaic power generation according to an embodiment of the present inventive concept.

As shown in FIG. 8, the solar cell panel array 1 integrated with the microinverter includes solar cell panels 20, and microinverters 10 for photovoltaic power generation integrally formed in the solar cell panels 20, and the solar cell panels 20 may be configured to be connected to each other in parallel as the microinverters 10 are connected to the bus wire 5 in parallel.

As described above, as the solar cell panels 20 are connected in parallel through the bus wire 5, the influence on the power generation efficiency of the entire solar cell panel array 1 is minimized even when specific solar cell panels 20 constituting the solar cell panel array 1 are not irradiated with sunlight due to a shade or the like. Generally, compared with a case of connecting the solar cell panels 20 in series, in which the output of the entire solar cell panel array 1 is limited to the power generated by the solar cell panels 20 not irradiated with sunlight due to a shade or the like, or driving of the solar cell panel array 1 is stopped, the problems that occur when the solar cell panels 20 are connected in series do not occur when the solar cell panels 20 are connected in parallel.

In addition, the solar cell panels 20 are configured to include a pair of first and second solar cell modules 410 and 420, and the microinverter 10 is formed to be integrated with the solar cell panel 20 so that the maximum power point of each of the first and second solar cell modules 410 and 420 may be tracked by adjusting deviation of current of the first and second solar cell modules 410 and 420 with a differential power to convert the power generated by the solar cell panel into AC power and output the AC power.

Referring to FIGS. 2 and 9, in order to perform tracking of the maximum power point described above, the microinverter 10 for photovoltaic power generation according to an embodiment of the present inventive concept is configured to include a case lower plate 100 formed in a plate shape; a case cover 200 configured to cover the case lower plate 100; and a substrate 300 installed on the case lower plate 100.

Since the case lower plate 100, the case cover 200 configured to cover the case lower plate 100, and the substrate 300 installed on the case lower plate 100 are the same as those described above, detailed description thereof will be omitted.

In FIGS. 3 and 4, the DC voltage device 380 or $V_{DC}$ may be a booster or a boosting device such as a chopper circuit or the like for boosting DC power to DC 400V or the like before AC conversion.

Figure 10:
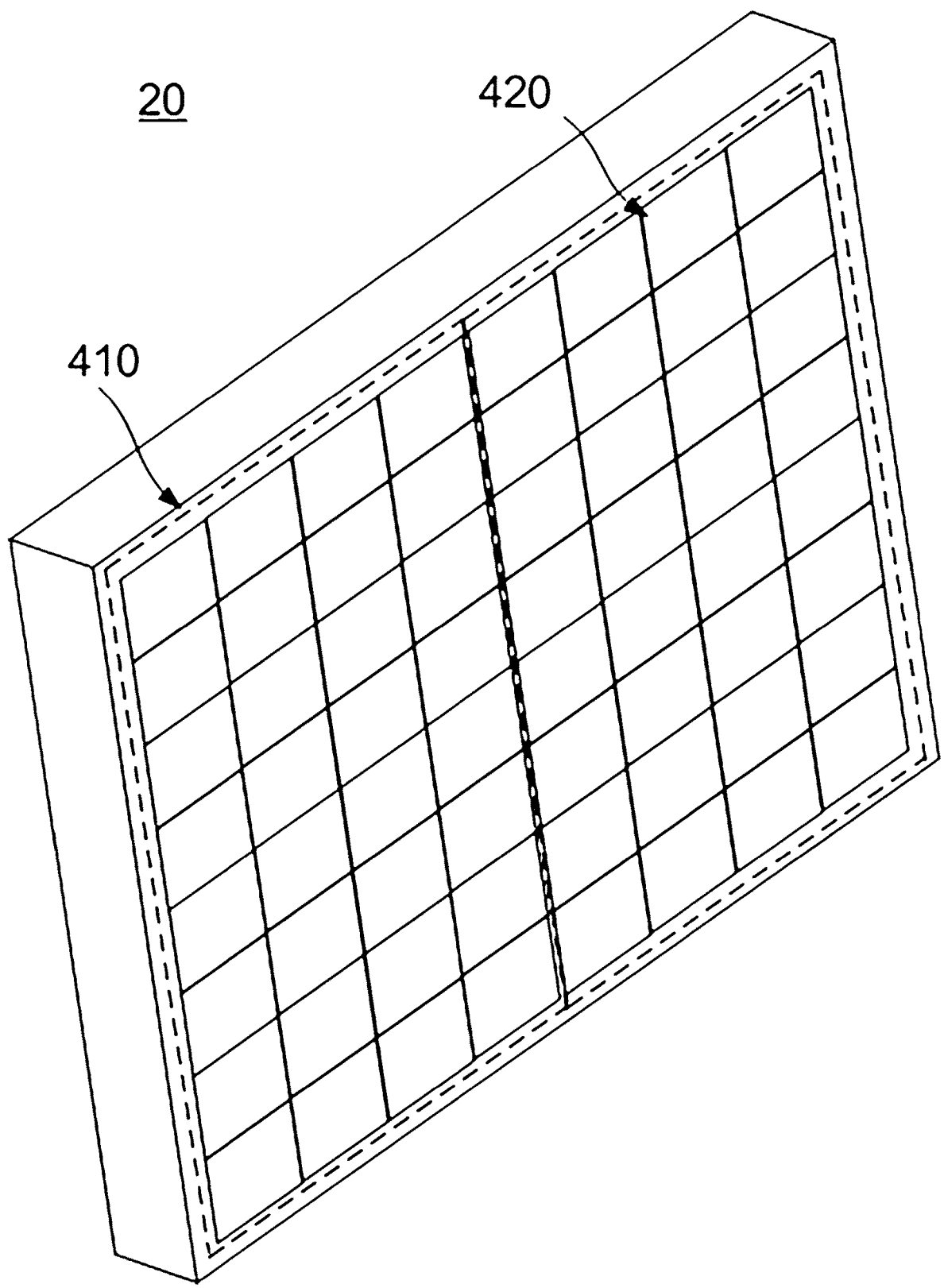
FIGS. 10 and 11 are views showing the configuration of a photovoltaic power generation system using a microinverter for photovoltaic power generation according to an embodiment of the present inventive concept.
Figure 11:
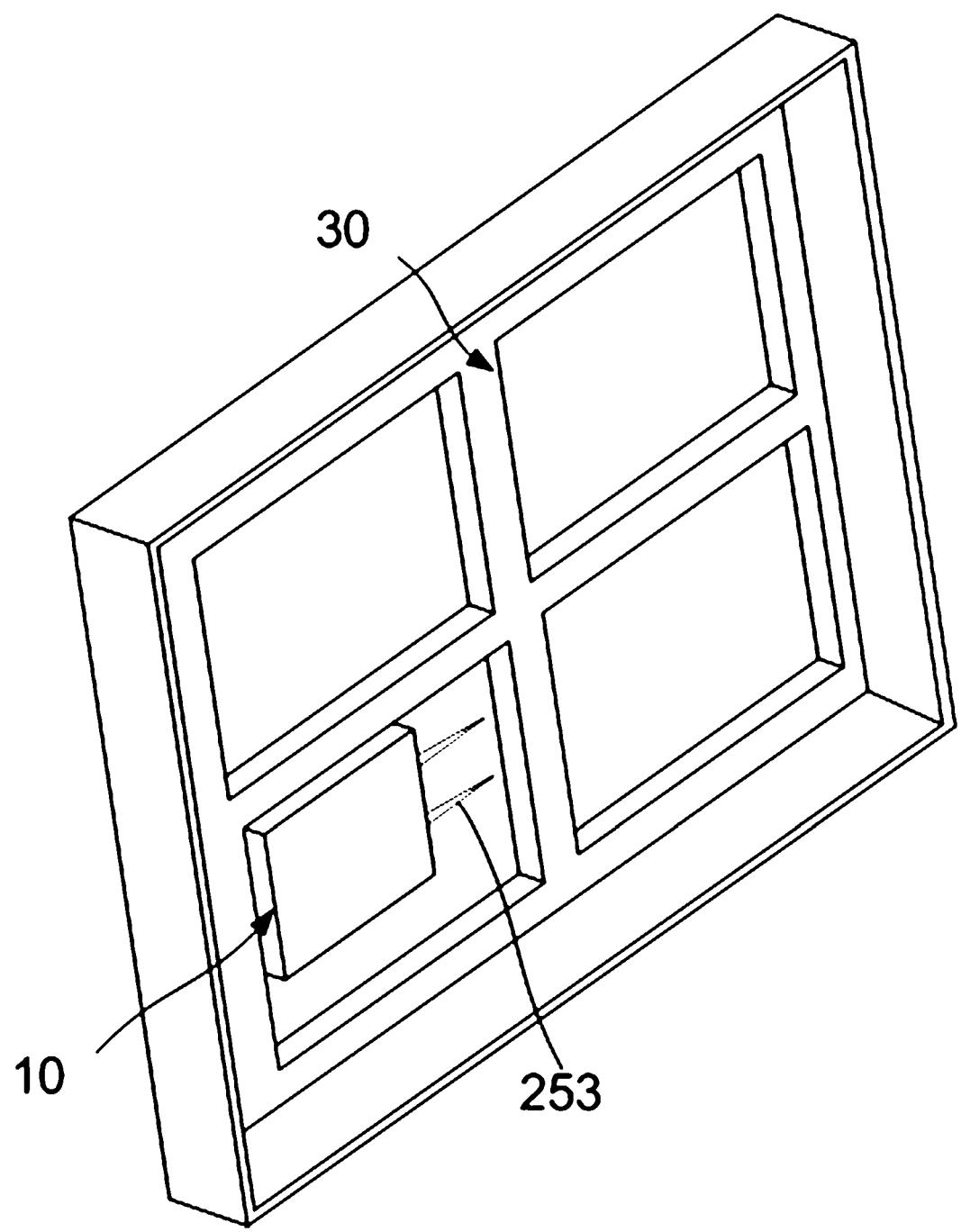
Figure 12:
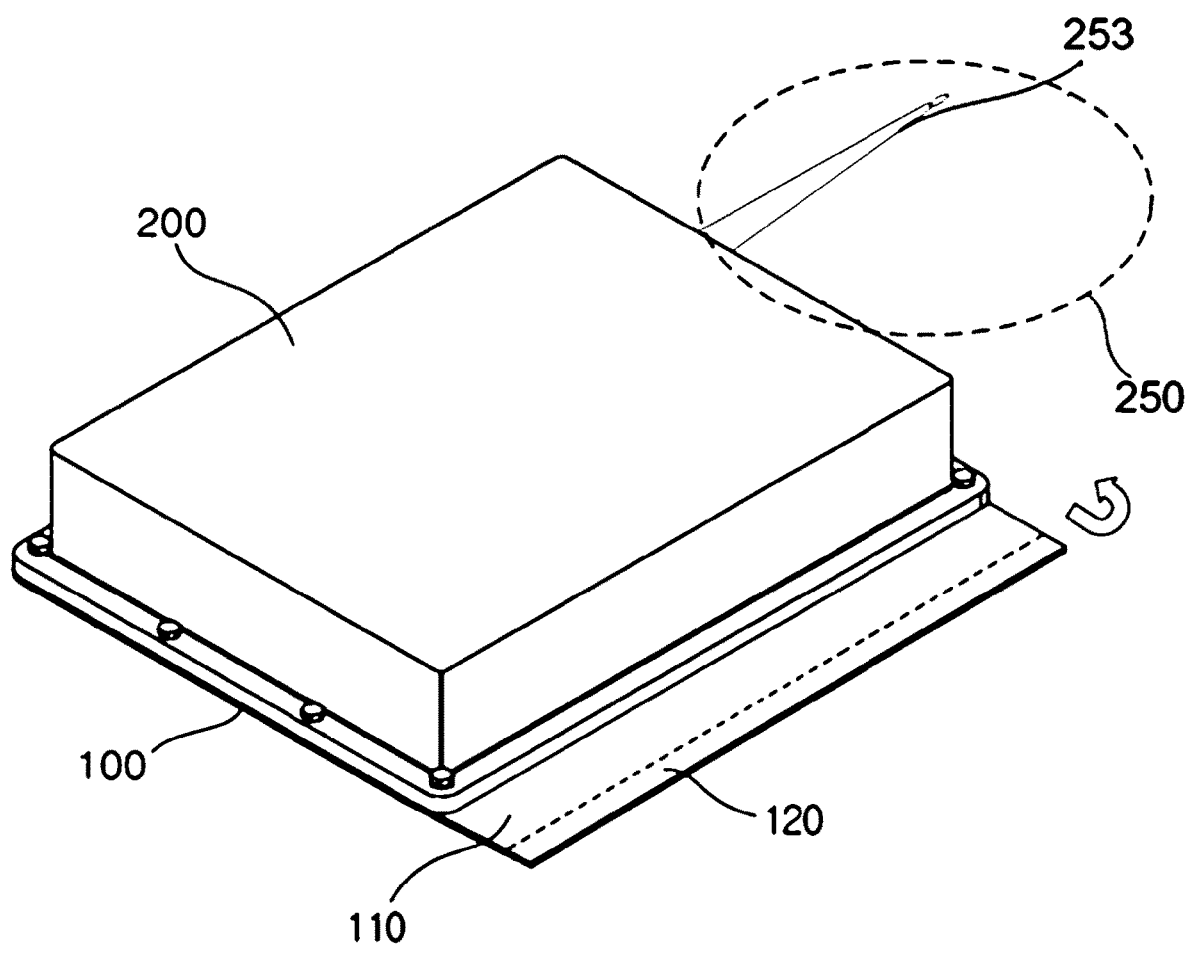
FIG. 12 is a view showing the configuration of a microinverter for photovoltaic power applied to the solar cell panel 20 of FIG. 11.

FIGS. 10 and 11 are views showing the configuration of a solar cell panel 20 integrated with a microinverter for photovoltaic power generation according to an embodiment of the present inventive concept, and FIG. 12 is a view showing the configuration of a microinverter 10 for photovoltaic power generation applied to the solar cell panel 20 of FIGS. 10 and 11.

Referring to FIGS. 10 and 11, the solar cell panel 20 integrated with a microinverter for photovoltaic power generation according to the present inventive concept is configured to include a microinverter 10 for photovoltaic power generation, a pair of solar cell modules 410 and 420, and a support 30 installed on the back side of the solar cell panel 20 to support the solar cell modules 410 and 420. FIG. 6 shows the front side of the solar cell panel 20, and FIG. 7 shows the back side (rear side) of the solar cell panel 20, the microinverter 10, and the support 30.

The microinverter 10 of the configuration described above may be configured to further include a near field communication unit 250 such as Wi-Fi, Bluetooth or the like as shown in FIGS. 11 and 12. In the case of FIGS. 11 and 12, it is shown that a Wi-Fi communication module having a Wi-Fi antenna 253 is configured as the near field communication unit 250. According to the configuration of the near field communication unit 250 as described above, the microinverter 10 transmits an identifier for identifying a corresponding solar cell panel 20 and information on a failure or error type to an external control center, a manager computer, an alarm device, or the like when a failure or an error occurs in the solar cell panel 20 due to a shade or the like, so that the solar cell panel 20 in which the failure or error has occurred may be easily identified and handled.

Describing with reference to FIG. 9 again, the case cover 200 may be provided with a heat sink paint layer 210 for releasing heat generated inside the microinverter to the outside.

The heat sink paint layer 210 is configured to include a paint 211, self-assembled particles 220, and heat sink particles 230.

The paint 211 may be a paint having characteristics such as moisture resistance, heat resistance, flame retardancy, fire resistance, and insulation, in which organic binders, lacquer-based resins, diluents, and the like generally used to prevent corrosion are mixed.

The self-assembled particles 220 may be configured of self-assembled metal particles including at least one material selected from a group configured of magnetic powders or crystalline graphite powders grown to be aligned in one direction by magnetic fields, tin, indium, bismuth, silver, copper and an alloy thereof self-assembled by heating or applying pressure to have high thermal conductivity. The self-assembled metal particles maintain a uniformly dispersed state in the paint as an oxide film is formed on the surface, and as the self-assembled metal particles form protrusions 212 together with the cured paint 211 as they are self-assembled and grown when the paint 211 mixed with the self-assembled particles 220 and the heat sink particles 230 is applied and thermally treated at a temperature of 120° C. to 250° C., the self-assembled metal particles significantly increase the surface area and, at the same time, perform a heat sink function of releasing heat inside the microinverter 10 to the outside by its own thermal conductivity.

As fine protrusions are formed on the surface of the cover 200 as the self-assembled particles 220 grow to be adjacent to each other when a magnetic field, heat or pressure is applied, the total surface area of the heat sink paint layer 210 is significantly increased, and heat sink efficiency is improved significantly.

In addition, the heat sink particles 230 may include heat sink materials such as phyllite, mordenite, Shungite and the like. The heat sink materials of the above configuration may form blend door heat sink particles 230 by 5 to 15 parts by weight of mordenite and 10 to 20 parts by weight of Shungite with respect to 80 to 120 parts by weight of phyllite. At this point, the heat sink particles 230 may be mixed to have XXX. The phyllite is configured in a grain structure of a plate shape (about 5 μm), contains germanium, selenium and the like, and has excellent thermal conductivity, as well as emitting a large amount of far-infrared radiation, which is radiant energy. The mordenite is a mineral configured in a grain structure of a spherical shape (1 to 3 μm) and having an excellent heat absorption function, and performs a function of releasing radiant energy and a function of heat storage and heat reduction by radiation of far-infrared rays. The Shungite is a mineral configured in a grain structure of a cylindrical shape (about 20 μm), emits far-infrared rays, i.e., radiant energy, by a spherical (ball-shaped) fullerene material bonded with 60 or more carbon atoms existing in the Shungite, and has a characteristic of excellent thermal conductivity. In addition, since the fullerene has a characteristic of shielding electromagnetic waves, the Shungite provides a heat sink function and allows further implementation of a function of shielding electromagnetic waves. In the configuration as described above, as the heat sink particles 230 are formed by arranging in order of connecting the mordenite particles of a spherical shape, Shungite particles of a cylindrical shape, mordenite particles of a spherical shape, and phyllite particles of a plate shape on the phyllite particles of a plate shape, minerals having a variety of particle shapes form a heat release structure. In the structure as described above, the phyllite particles of a plate shape emit far-infrared rays and absorb heat by the heat generated from a heat source, and transfer the heat generated from the heat source to the mordenite particles of a spherical shape by thermal conductivity, and the mordenite particles store the transferred heat (provide an effect of enhancing the efficiency of releasing radiant energy) and transfer the heat to the Shungite particles of a cylindrical shape owing to the characteristics of far-infrared radiation and thermal conductivity, and the Shungite particles transfers the heat to the mordenite particles of a spherical shape positioned above owing to the characteristics of far-infrared radiation and thermal conductivity to store the heat, and at this point, since the structure of hollow fullerene particles having carbon bonds of a ball shape in the Shungite particles having a cylindrical shape transfers energy between the fullerene particles by a resonance phenomenon of resonating on the basis of atomic vibration, it may perform faster energy transfer (heat release). The mordenite particles of a spherical shape stores again the transferred heat energy, and finally transfers the energy to the phyllite particles of a plate shape at the terminal owing to the characteristics of far-infrared radiation and thermal conductivity, and as the phyllite particles of a plate shape secure a large heat sink area again and emit far-infrared rays using the heat sink area, heat is released to the outside through an interface penetration using the permeability property of the far-infrared rays (radiant energy), rather than conventional flow of heat through an interface contact with the air. That is, the surface area is significantly increased by the protrusion structure formed by the self-assembled particles 220 of the heat sink paint layer 210 of the present inventive concept, and as the heat is rapidly released to the outside by the self-assembled particles 220 and the heat sink particles 230 configured inside the paint 211, the heat inside the microinverter 10 is efficiently released to the outside.

In addition, in the present inventive concept, the case lower plate 100 may be configured to include an extended insertion unit 110 extended from the case lower plate 100 toward the outside; and a hinge-coupling unit 120 hinge-coupled to the extended insertion unit 110 to be rotatably installed, so that the extended insertion unit 110 may be insert-coupled between the solar cell panel 20 and one side of the support 30, and the hinge-coupling unit 120 may be rotated and bolt-coupled on the other side of the support 30.

As described above, the solar cell panel array of the present inventive concept may be configured by integrally mounting the microinverter 10 on each solar cell panel 20 and connecting the solar cell panels 20 in parallel. Accordingly, in the case where the solar cell panels are connected in series as shown in the prior art, the overall output is abruptly lowered when a shade, an error or the like occurs in some solar cell panels. However, in the case of the present inventive concept, as the solar cell panels are connected in parallel, the effect of the shade or broken solar cell panels on the output of the entire solar cell panel array is minimized, and thus degradation of the output is significantly lowered, and therefore, power generation can be stably performed even when a shade or an error occurs in some solar cell panels.

Figure 13:
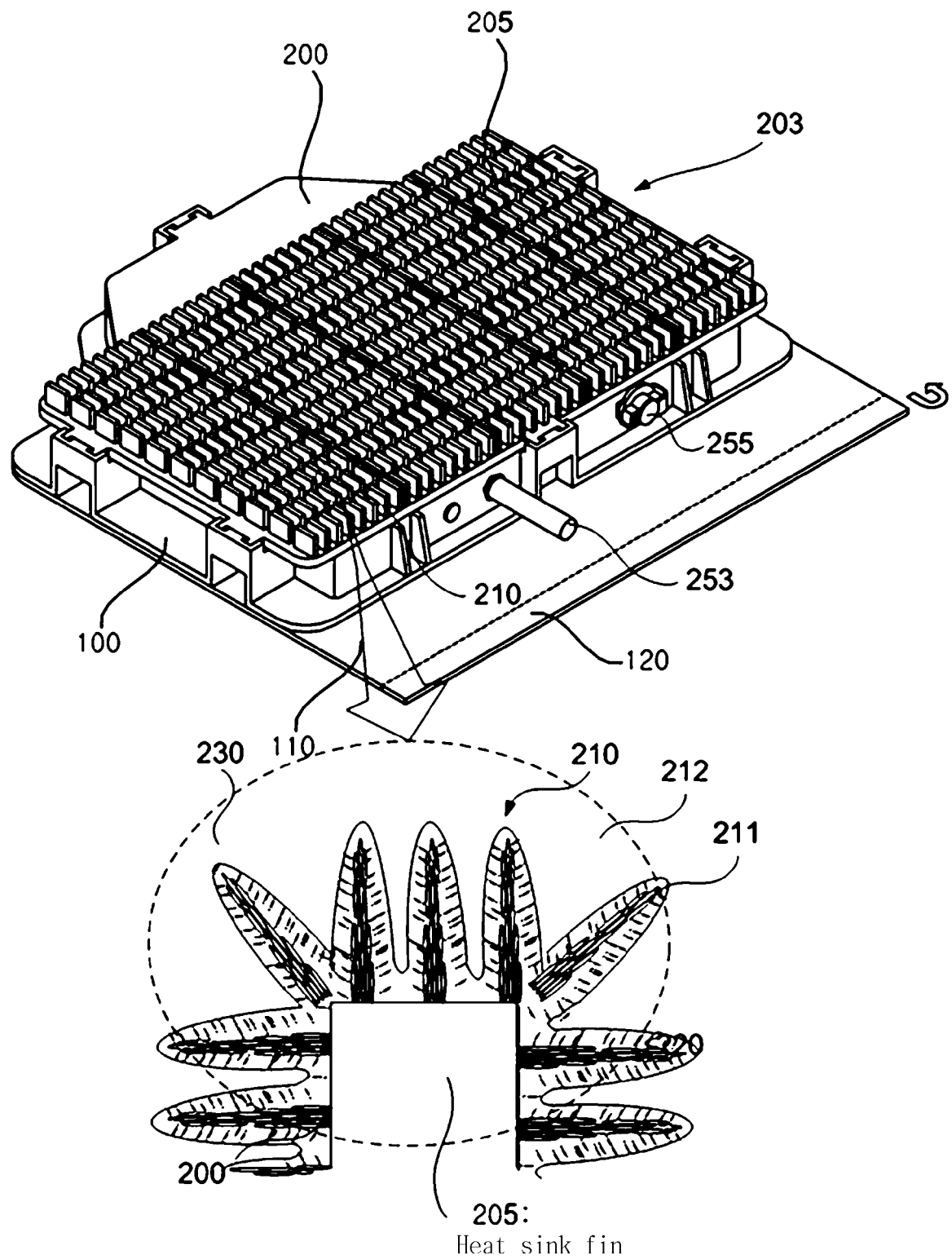
FIG. 13 is a perspective view showing a microinverter for photovoltaic power generation according to an embodiment of the present inventive concept.
Figure 14:
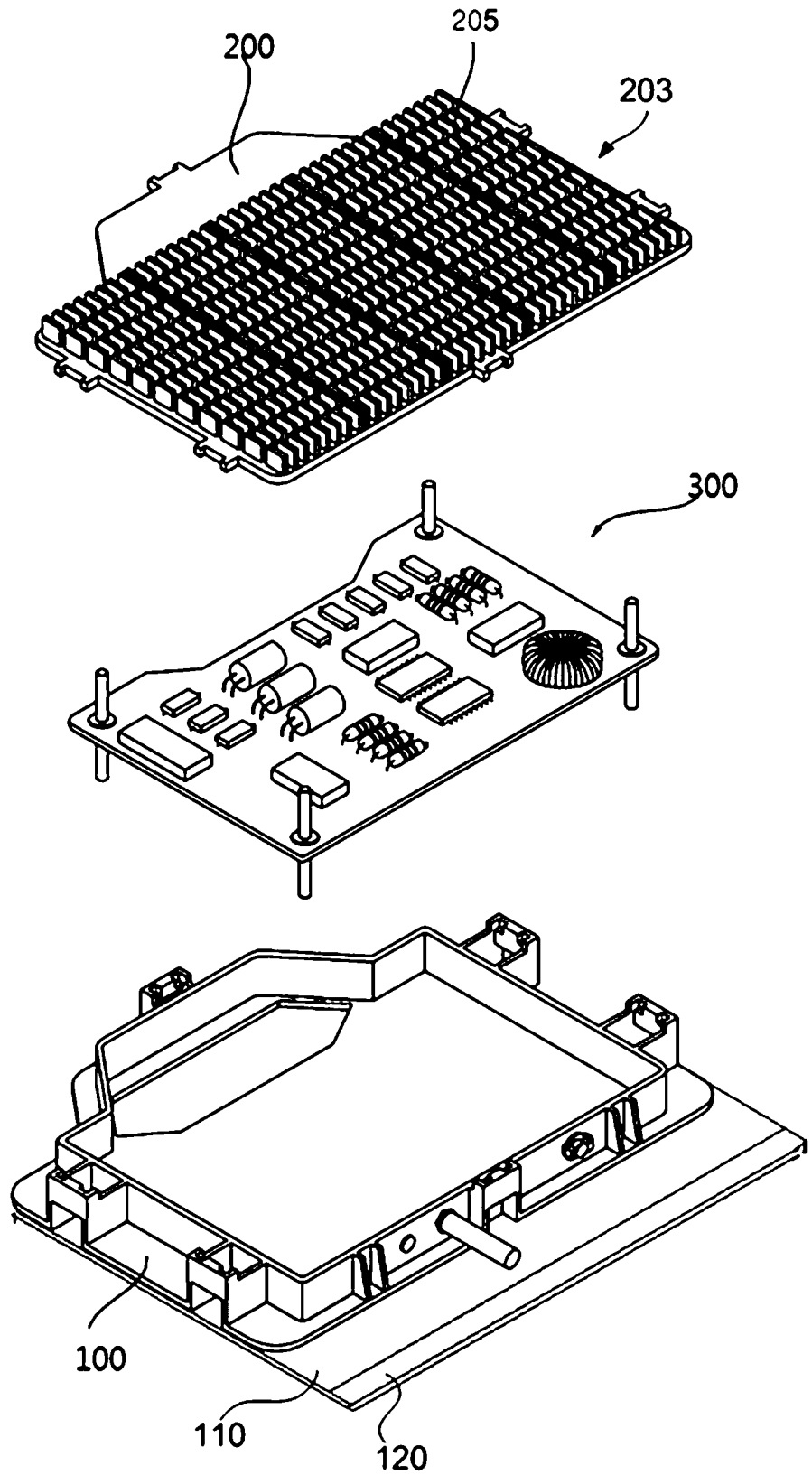
FIG. 14 is an exploded perspective view showing a microinverter for photovoltaic power generation according to an embodiment of the present inventive concept.

FIG. 8 is a front perspective view (a) and a rear perspective view (b) showing a solar cell panel array 1 integrated with a microinverter for photovoltaic power generation according to an embodiment of the present inventive concept, FIG. 13 is a perspective view showing a microinverter for photovoltaic power generation provided with a heat sink according to an embodiment of the present inventive concept, FIG. 14 is an exploded perspective view showing a microinverter for photovoltaic power generation provided with a heat sink according to an embodiment of the present inventive concept, and FIG. 3 is a functional block diagram showing up to the front end of a converter performing MPPT control and DC boosting for AC conversion of the microinverter for photovoltaic power generation provided with a heat sink according to an embodiment of the present inventive concept.

As shown in FIG. 8, the solar cell panel array 1 integrated with the microinverter includes solar cell panels 20 and microinverters 10 for photovoltaic power generation integrally formed in the solar cell panels, and the solar cell panels 20 may be configured to be connected to each other in parallel as the microinverters 10 are connected to the bus wire 5 in parallel.

As described above, as the solar cell panels 20 are connected in parallel through the bus wire 5, the influence on the power generation efficiency of the entire solar cell panel array 1 is minimized even when specific solar cell panels 20 constituting the solar cell panel array 1 are not irradiated with sunlight due to a shade or the like. Generally, compared with a case where when the solar cell panels 20 are connected in series, the output of the entire solar cell panel array 1 is limited to the power generated by the solar cell panels 20 not irradiated with sunlight due to a shade or the like, or driving of the solar cell panel array 1 is stopped, when the solar cell panels 20 are connected in parallel, the problems that occur when the solar cell panels 20 are connected in series do not occur.

In addition, the solar cell panels 20 are configured to include a pair of first and second solar cell modules 410 and 420, and the microinverter 10 is detachably formed to be integrated with the solar cell panel 20 so that the maximum power point of each of the first and second solar cell modules 410 and 420 may be tracked by adjusting deviation of current of the first and second solar cell modules 410 and 420 with a differential power to convert the power generated by the solar cell panel into AC power and output the AC power.

Referring to FIGS. 13 and 14, in order to perform tracking of the maximum power point described above, the microinverter 10 for photovoltaic power generation according to an embodiment of the present inventive concept is configured to include a case lower plate 100 formed in a plate shape; a case cover 200 having a heat sink configured of heat sink fins formed on the surface to cover the case lower plate 100; and a substrate 300 installed on the case lower plate 100.

Since the case lower plate 100; the case cover 200 configured to cover the case lower plate 100; and the substrate 300 installed on the case lower plate 100 are the same as those described above, detailed description thereof will be omitted.

Figure 15:
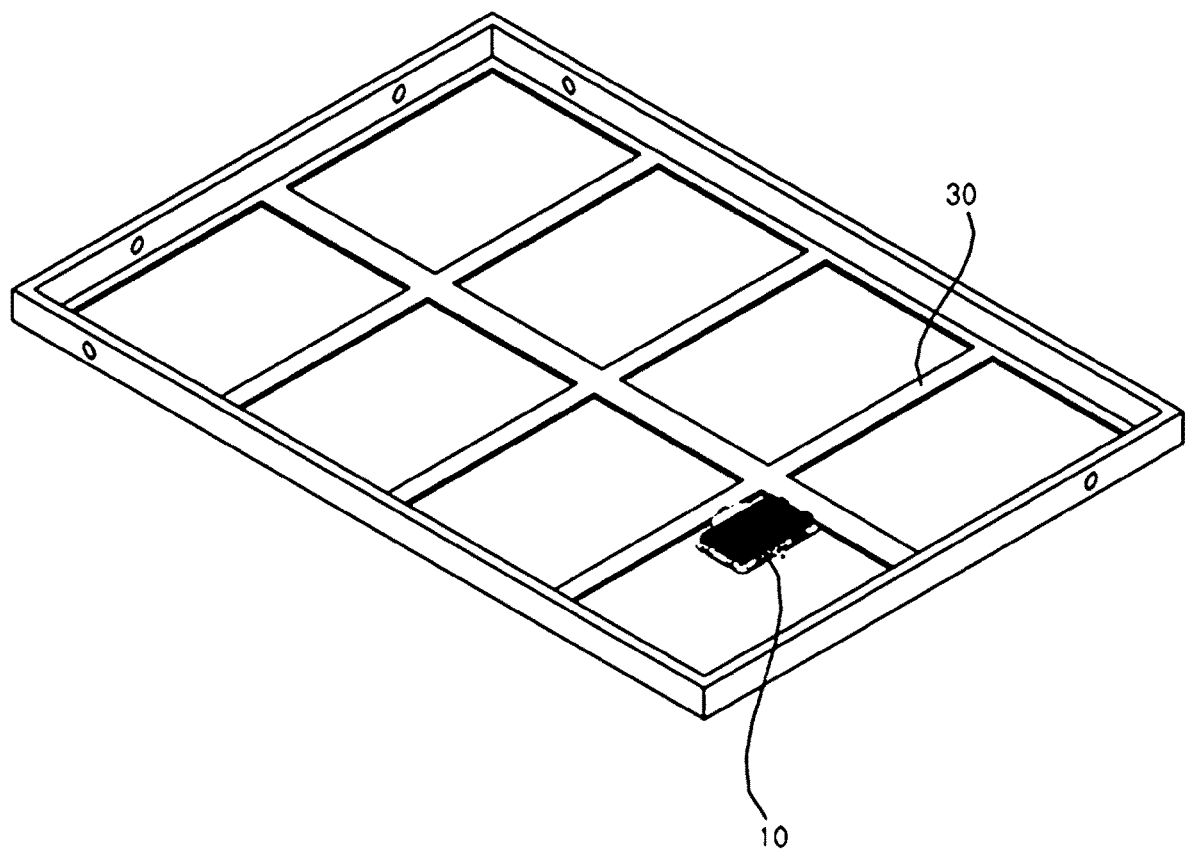
FIG. 15 is a bottom perspective view showing the solar cell panel 20 of FIG. 10.

FIG. 10 is a plan perspective view showing a solar cell panel 20 constituting a solar cell panel array 1 integrated with a microinverter according to an embodiment of the present inventive concept, and FIG. 15 is a bottom perspective view of the solar cell panel 20 of FIG. 10.

Referring to FIGS. 10 and 15, the solar cell panel 20 integrated with a microinverter for photovoltaic power generation according to the present inventive concept is configured to include a microinverter 10 for photovoltaic power generation, a pair of solar cell modules 410 and 420, and a support 30 installed on the back side of the solar cell panel 20 to support the solar cell modules 410 and 420. FIG. 10 shows the front side of the solar cell panel 20, and FIG. 15 shows the back side (bottom side) of the solar cell panel 20, the microinverter 10, and the support 30.

That is, in the solar cell panel 20 integrated with a microinverter for photovoltaic power generation according to the present inventive concept, the microinverter 10 for photovoltaic power generation is configured to include a case lower plate 100 formed in a plate shape; a case cover 200 configured to cover the case lower plate 100; and a substrate 300 installed on the case lower plate 100, and as shown in FIG. 3, the substrate 300 is configured to include a first conductor 310 connected to a first solar cell module 410 in parallel; a second conductor 320 connected to a second solar cell module 420 in parallel; a first switch 330 connected to the first solar cell module 410 and the first conductor 310 in parallel; a second switch 340 connected to the second solar cell module 420 and the second conductor 320 in parallel; a shuffling inductor 350 connected between the first and second conductors 310 and 320 and the first and second switches 330 and 340; a boost inductor 360 connected to the first solar cell module 410, the first conductor 310, and the first switch 330; a third switch 370 connected to the boost inductor 360 and also connected to the second solar cell module 420, the second conductor 320, and the second switch 340; a rectifying device 390; a DC voltage device 380 such as a DC transformer or the like that boosts DC power to convert into commercial AC power and then outputs the boosted DC power to a DC-AC converter; and an inverter circuit, although not shown in the drawing, for outputting commercial AC power such as 220V-60 Hz or the like by performing DC-AC conversion after receiving the boosted DC power. In addition, at this point, it may be configured to operate the first switch 330, the second switch 340, and the third switch 370 by the MPPT controller.

The microinverter 10 of the configuration described above may be configured to further include a near field communication unit 253 (see FIG. 13) such as Wi-Fi, Bluetooth or the like, and an AC output port 255. In the case of FIGS. 10 and 15, it is shown that a Wi-Fi communication module having a Wi-Fi antenna is configured as the near field communication unit 253. According to the configuration of the near field communication unit 253 as described above, the microinverter 10 transmits an identifier for identifying a corresponding solar cell panel 20 and information on a failure or error type to an external control center, a manager computer, an alarm device, or the like when a failure or an error occurs in the solar cell panel 20 due to a shade or the like, so that the solar cell panel 20 in which the failure or error has occurred may be easily identified and handled. In addition, it may be configured to directly connect the solar cell panel to the power system of commercial power by configuring the AC output port 255 as a commercial power plug to be connected to a power socket.

Describing with reference to FIG. 13 again, the case cover 200 has a heat sink 203 configured of heat sink fins 205 on the surface to release the heat generated inside the microinverter to the outside. In addition, a heat sink paint layer 210 for improving the heat sink efficiency by further increasing the surface area of the heat sink 203 may be formed on the surface of the heat sink 203 and the surface of the case lower plate.

The heat sink paint layer 210 is configured to include a paint 211, self-assembled particles 220, and heat sink particles 230.

Since the paint 211, the self-assembled particles 220, and the heat sink particles 230 are the same as those described above, detailed description thereof will be omitted.

Hereinafter, a microinverter for photovoltaic power generation according to the present inventive concept will be described in detail with reference to the drawings.

Figure 16:
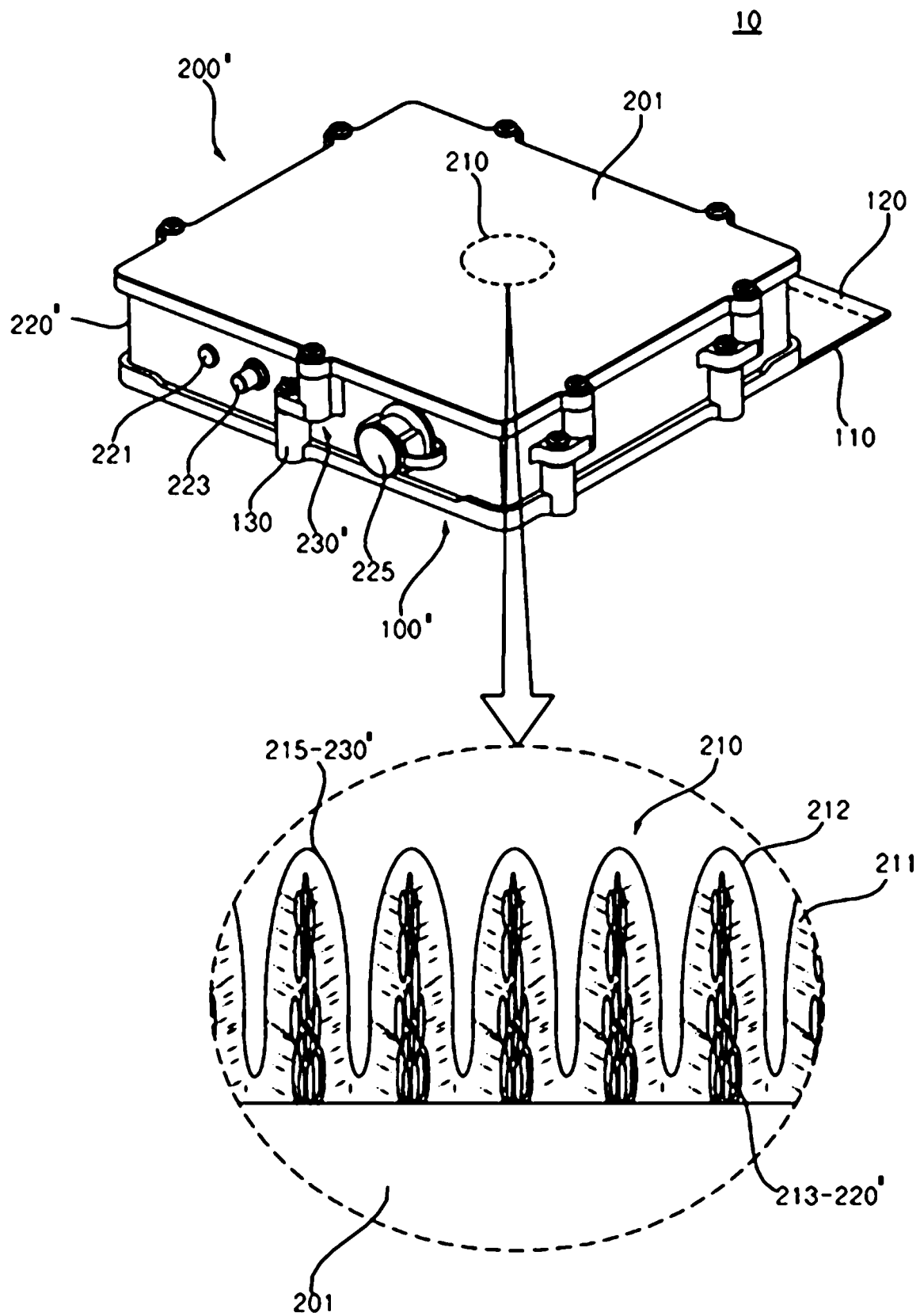
FIG. 16 is a perspective view showing a microinverter for photovoltaic power generation according to an embodiment of the present inventive concept.
Figure 17:
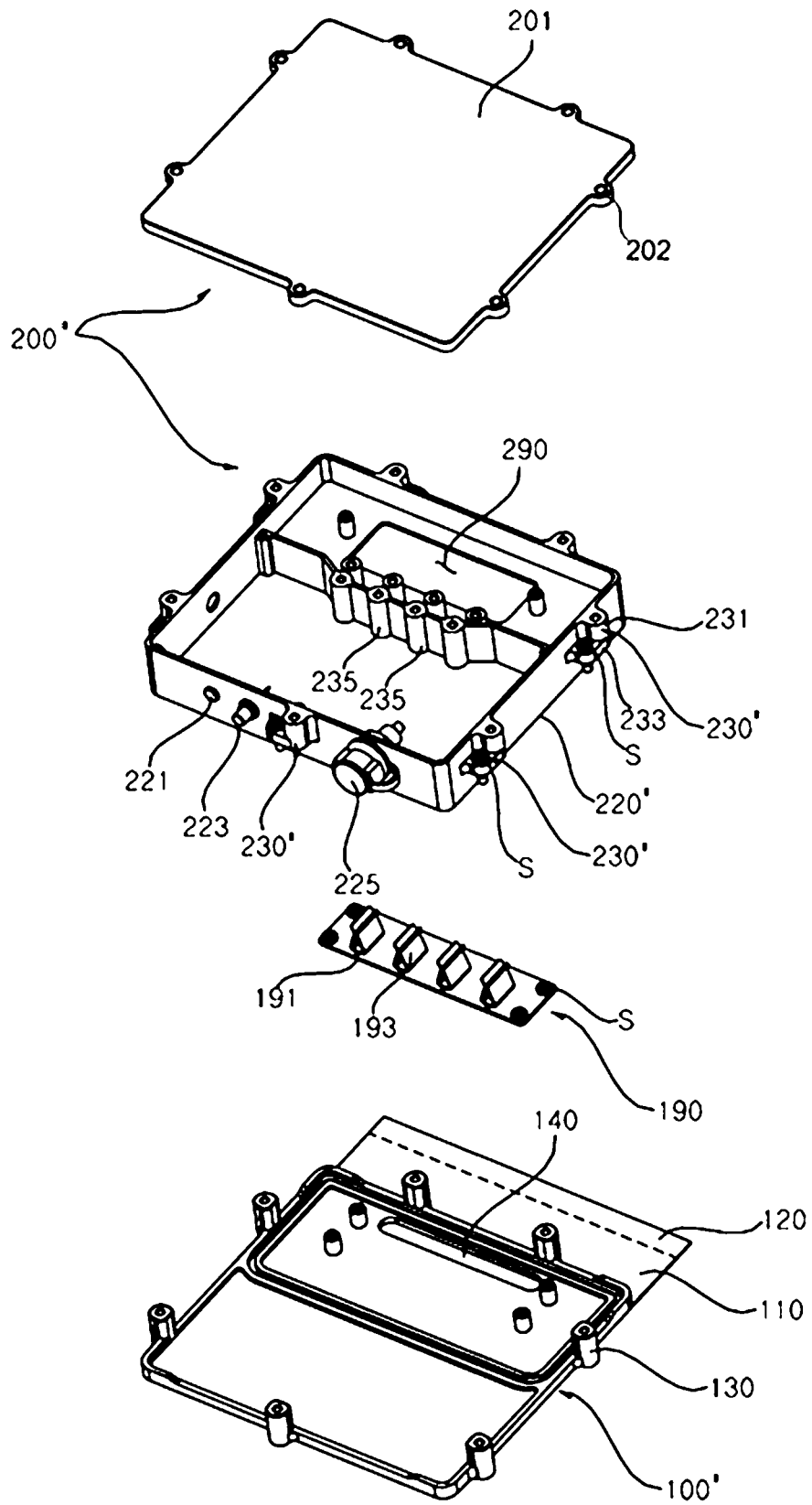
FIG. 17 is an exploded perspective view showing a microinverter for photovoltaic power generation of FIG. 16.
Figure 18:
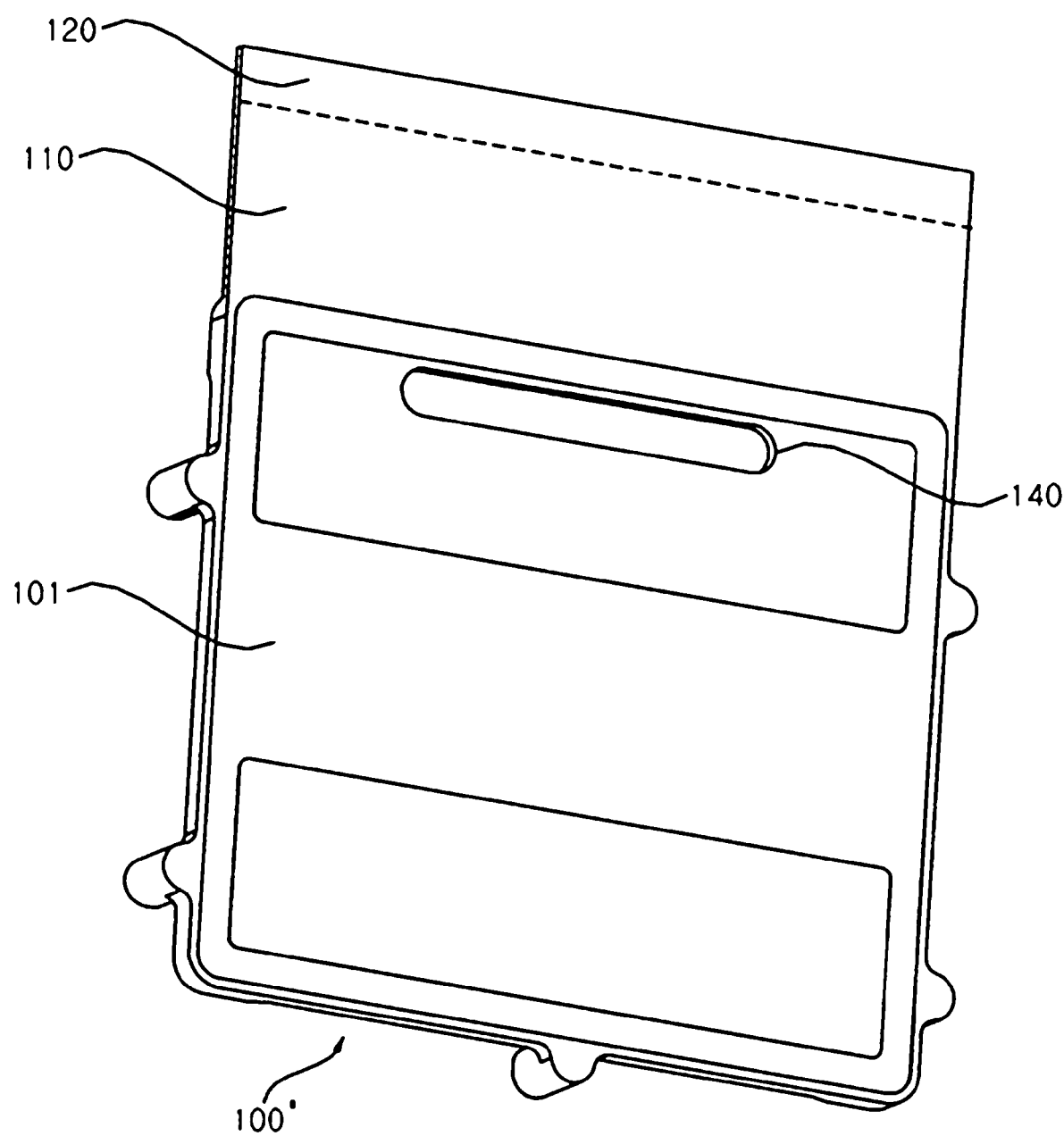
FIG. 18 is a bottom perspective view showing a fixed panel 100'.
Figure 19:
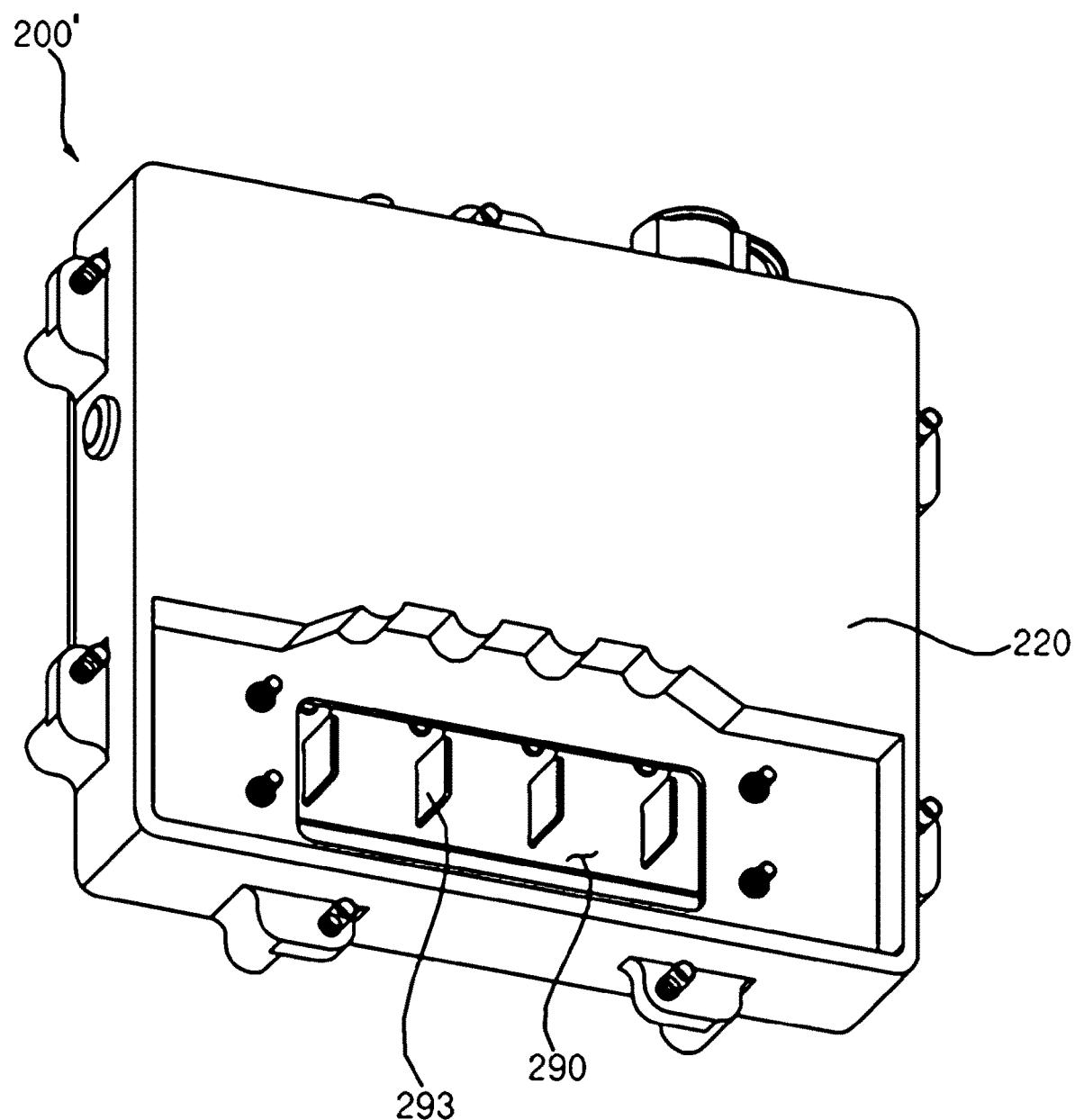
FIG. 19 is a bottom perspective view showing a detachable microinverter unit 200'.
Figure 20:
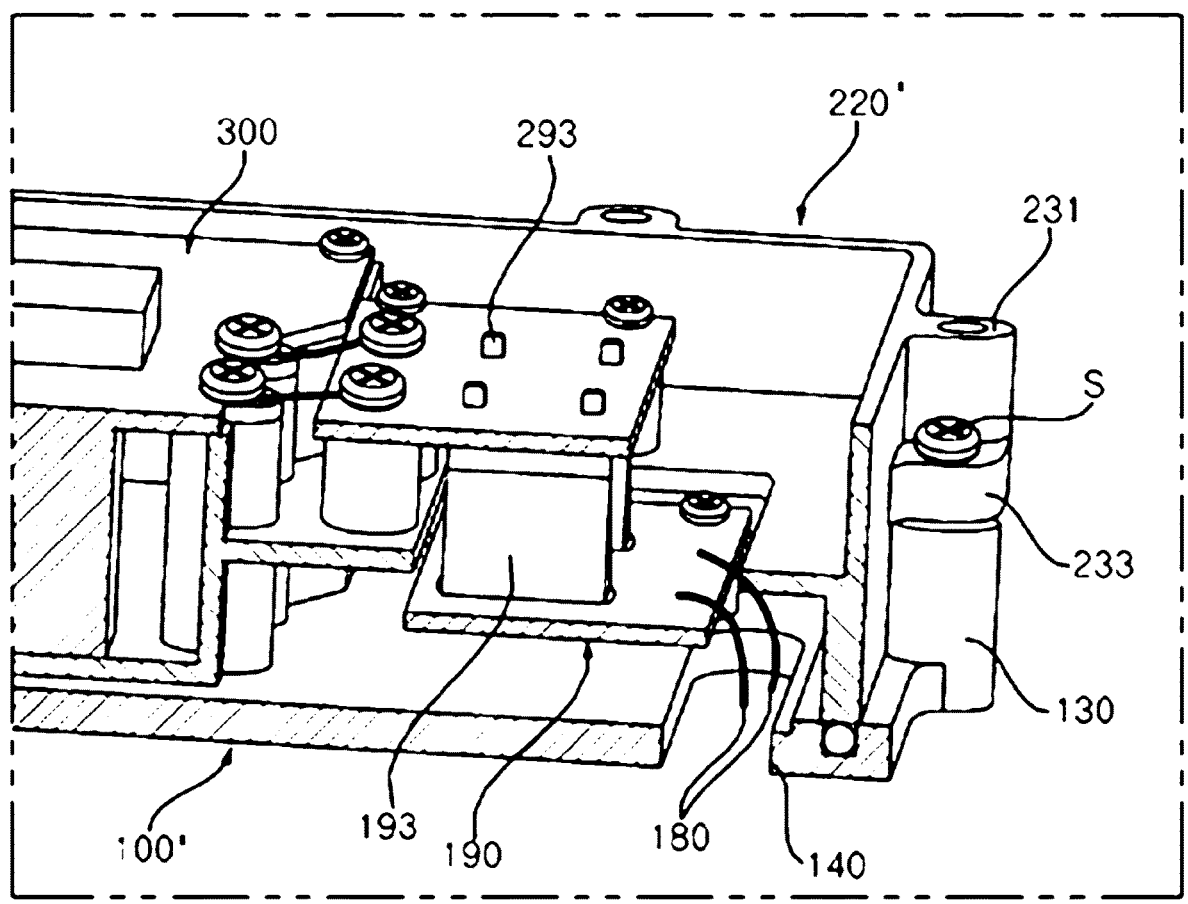
FIG. 20 is a partial cross-sectional view showing the microinverter for photovoltaic power generation of FIG. 16.

FIG. 16 is a perspective view showing a microinverter 10 for photovoltaic power generation according to an embodiment of the present inventive concept, FIG. 17 is an exploded perspective view showing a microinverter for photovoltaic power generation of FIG. 16, FIG. 18 is a bottom perspective view showing a fixed panel 100', FIG. 19 is a bottom perspective view showing a detachable microinverter unit 200', and FIG. 20 is a partial cross-sectional view showing the microinverter 10 for photovoltaic power generation of FIG. 16.

As shown in FIGS. 16 to 20, the microinverter 10 for photovoltaic power generation (hereinafter, referred to as a 'microinverter 10') is configured to include a fixed panel 100' attached to the rear surface of the solar cell panel, and a detachable microinverter unit 200' (hereinafter, referred to as a 'microinverter unit 200') attached to and detached from the fixed panel 100' by screw-coupling.

The fixed panel 100' may be configured to include a solar cell wire through hole 140 formed for a solar cell wire 180, which draws out power of the solar cell panel 20, to pass through, a plurality of fixing panel nut units 130 formed in an edge area in a cylindrical column shape having a female screw to which a screw S is coupled to fix the fixed panel 100' by screw-coupling, and an inverter terminal socket unit 190 including an inverter terminal socket substrate 191 to which inverter terminal sockets 193 connected to the solar cell wire 180 are attached.

As shown in FIGS. 16 to 18, the fixed panel 100' is configured to include an extended insertion unit 110 extended from the fixed panel 100' toward the outside; and a hinge-coupling unit 120 hinge-coupled to the extended insertion unit 110 to be rotatably installed, so that the extended insertion unit 110 may be insert-coupled between the solar cell panel 20 and one side of the support 30, and the hinge-coupling unit 120 may be rotated and bolt-coupled on the other side of the support 30. After an adhesive 101 for attaching the fixed panel 100' to the rear surface of the solar cell panel 20 is applied to the rear surface of the fixed panel 100' of the configuration described above, the fixed panel 100' may be mounted on the rear surface of the solar cell panel 20 by insert-coupling the extended insertion unit 110 between the solar cell panel 20 and one side of the support 30, and rotating and bolt-coupling the hinge-coupling unit 120 on the other side of the support 30. At this point, the adhesive 101 may be a silicone bond or the like.

The microinverter unit 200' is configured to include an inverter terminal socket unit through hole 290 having an open top and formed through the bottom surface so that the inverter terminal socket unit 190 of the fixed panel 100' may be inserted inside the microinverter unit 200', an inverter box 220' attached to and detached from the fixed panel 100' by screw-coupling as a plurality of double nut units 230' is formed along the outer edge, a substrate 300 having inverter terminals 293 coupled to the inverter terminal sockets 193, and mounted inside the inverter box 220', and an inverter box cover 201 that covers the inverter box 220'.

The double nut unit 230' is configured to include a cover nut unit 231 formed at one side to screw-couple the inverter box cover, and a fixing flange 233 formed to be extended from the lower end of the cover nut unit 231 in the lateral direction to have a through hole 234 formed to communicate with the fixing panel nut unit 130, and screw-coupled to the fixed panel 100' by a screw S.

An LED unit 221 for displaying the driving state of the inverter 10, a communication antenna 223 for communication, and an AC output port 225 for outputting AC power on which power control is performed after power is generated by sunlight are formed on one side of the inverter box 220'.

As shown in FIG. 5, the substrate 300 is configured to receive power generated by the solar cell panel 20 through the inverter terminals 293 coupled to the inverter terminal sockets 193 of the inverter terminal socket unit 190, and output AC power through the AC output port 225 by performing power control such as MPPT control, DC-AC conversion, power factor control or the like. In addition, the substrate 300 may include a communication module therein so that the microinverter 10 may transmit driving state information to a management server or the like.

The communication antenna 223 and the communication module may be configured to perform near field communication such as Wi-Fi, Bluetooth or the like. As the communication antenna and the communication module are provided, the microinverter 10 transmits an identifier for identifying a corresponding solar cell panel 20 and information on a failure or error type to an external control center, a manager computer, an alarm device, or the like when a failure or an error occurs in the solar cell panel 20 due to a shade or the like, so that the solar cell panel 20 in which the failure or error has occurred may be easily identified and handled.

FIG. 3 is a functional block diagram showing up to the front end of a converter performing MPPT control and DC boosting for AC conversion of the microinverter for photovoltaic power generation according to an embodiment of the present inventive concept.

FIG. 8 is a front perspective view (a) and a rear perspective view (b) showing a solar cell panel array 1 integrated with a microinverter for photovoltaic power generation according to an embodiment of the present inventive concept, and FIG. 6 is a rear view showing a solar cell panel integrated with a microinverter for photovoltaic power generation according to an embodiment of the present inventive concept.

As shown in FIGS. 6 and 8, the solar cell panel array 1 integrated with the microinverter includes solar cell panels 20 and microinverters 10 for photovoltaic power generation integrally formed in the solar cell panels, and as the microinverters 10 are connected to the bus wire 5 in parallel, the solar cell panels 20 may be configured to be connected to each other in parallel.

As described above, as the solar cell panels 20 are connected in parallel through the bus wire 5, the influence on the power generation efficiency of the entire solar cell panel array 1 is minimized even when specific solar cell panels 20 constituting the solar cell panel array 1 are not irradiated with sunlight due to a shade or the like. Generally, compared with a case where when the solar cell panels 20 are connected in series, the output of the entire solar cell panel array 1 is limited to the power generated by the solar cell panels 20 not irradiated with sunlight due to a shade or the like, or driving of the solar cell panel array 1 is stopped, when the solar cell panels 20 are connected in parallel, the problems that occur when the solar cell panels 20 are connected in series do not occur.

In addition, the solar cell panels 20 are configured to include a pair of first and second solar cell modules 410 and 420, and the microinverter 10 is formed to be integrated with the solar cell panel 20 so that the maximum power point of each of the first and second solar cell modules 410 and 420 may be tracked by adjusting deviation of current of the first and second solar cell modules 410 and 420 with a differential power to convert the power generated by the solar cell panel into AC power and output the AC power.

Referring to FIGS. 6 and 8, the solar cell panel 20 integrated with a microinverter for photovoltaic power generation according to the present inventive concept is configured to include a microinverter 10 for photovoltaic power generation, a pair of solar cell modules 410 and 420, and a support 30 installed on the back side of the solar cell panel 20 to support the solar cell modules 410 and 420. FIG. 8 shows the front side of the solar cell panel 20, and FIG. 6 shows the back side (rear side) of the solar cell panel 20, the microinverter 10, and the support 30.

When the microinverter 10 of the above configuration is mounted on the rear surface of the solar cell panel 20, the microinverter 10 is fixed on the rear surface of the solar cell panel 20 of the fixed panel 100' by applying an adhesive on the bottom surface of the fixed panel 100' first, insert-coupling the extended insertion unit 110 between the solar cell panel 20 and one side of the support 30 on the rear surface of the solar cell panel 20, and rotating and bolt-coupling the hinge-coupling unit 120 on the other side of the support 30.

Thereafter, as the screw S is inserted through the fixing flange 233 of the double nut unit 230' of the inverter box 220' and then screw-coupled to the fixing panel nut unit 130, the inverter box 220', in which the substrate or the like is mounted, may be detachably mounted on the fixed panel 100'. At this point, as the inverter terminals 293 are forcibly insert-coupled to the inverter terminal sockets 193, the substrate 300 and the solar cell panel 20 electrically communicate each other.

Then, the open top of the inverter box 220' is covered with the inverter box cover 201 and tightly sealed by inserting a screw through a cover flange 202 formed to have a through hole in the edge of the inverter box cover 201, and screw-coupling the screw S to the cover nut unit 231.

As described above, as the present inventive concept may easily attach and detach the detachable microinverter unit 200' including the inverter box 220' and the inverter box cover 201 using screws, repair and replacement may be easily performed, and thus maintenance of the microinverter 10 can be performed remarkably easily.

It is obvious that various fastening members such as bolts or screws may be applied as the screw.

Describing with reference to FIG. 16 again, a heat sink paint layer 210 for releasing the heat generated inside the microinverter to the outside may be formed on the outer surfaces of the inverter box cover 201 and the inverter box 220'.

The heat sink paint layer 210 is configured to include a paint 211, self-assembled particles 213, and heat sink particles 215.

Since the paint 211, the self-assembled particles 220, and the heat sink particles 230 are the same as those described above, detailed description thereof will be omitted.

In addition, as the heat sink paint effectively releases the heat inside the inverter to the outside, there is an effect of remarkably lowering occurrence of a failure of the inverter caused by the heat.

Although the technical spirit of the present inventive concept described above has been described in detail in the preferred embodiments, it should be noted that the above-described embodiments are for illustrative purposes and not to limit the present inventive concept. In addition, those skilled in the art may understand that various embodiments are possible within the scope of the technical spirit of the present inventive concept. Therefore, the true technical protection scope of the present inventive concept should be defined by the technical spirit of the appended claims.

The invention claimed is:

1. A solar cell panel array, comprising:
a plurality of solar cell panels; and
a plurality of microinverters, wherein each microinverter of the plurality of microinverters is electrically connected to a respective solar cell panel of the plurality of solar cell panels,
wherein each microinverter of the plurality of microinverters comprises:
a fixed panel attached to a rear surface of a solar cell panel, wherein the fixed panel includes:
a solar cell wire through hole formed for a solar cell wire, which draws out power of the solar cell panel, to pass through; and
a plurality of fixing panel nut units formed in an edge area in a cylindrical column shape having a female screw to which a screw is coupled to fix the fixed panel by screw-coupling; and
a detachable microinverter unit attachable to and detachable from the fixed panel by screw-coupling, wherein the detachable microinverter unit includes:
an inverter box attached to and detached from the fixed panel by screw-coupling as a plurality of double nut units is formed along an edge;
a substrate mounted inside the inverter box; and
an inverter box cover that covers the inverter box, and
wherein the microinverters of the plurality of microinverters are electrically connected to each other in parallel.

2. The solar cell panel array according to claim 1, wherein each solar cell array panel of the plurality of solar cell array panels includes a first solar cell module and a second solar cell module.

3. The solar cell panel array according to claim 1, wherein the microinverter comprises:
a case lower plate formed in a plate shape;
a case cover configured to cover the case lower plate; and
a substrate installed on the case lower plate.

4. The solar cell panel array according to claim 3, wherein the substrate includes:
a first conductor connected to a first solar cell module in parallel;
a second conductor connected to a second solar cell module in parallel;
a first switch connected to the first solar cell module and the first conductor in parallel;
a second switch connected to the second solar cell module and the second conductor in parallel;
a shuffling inductor connected between the first and second conductors and the first and second switches;
a boost inductor connected to the first solar cell module, the first conductor, and the first switch;
a third switch connected to the boost inductor, the second solar cell module, the second conductor, and the second switch; and
an MPPT control unit for controlling operation of tracking a maximum power point based on respective voltages of the first solar cell module and the second solar cell module, wherein
the MPPT control unit operates the first switch, the second switch, and the third switch.

5. The solar cell panel array according to claim 4, wherein the MPPT control unit includes:
an MTTP unit for tracking a maximum power point based on respective voltages of the first solar cell module and the second solar cell module; and
a voltage adjustment unit for adjusting an output voltage of the MTTP unit.

6. The solar cell panel array according to claim 5, wherein the first switch and the second switch operate based on the output voltage of the MPPT unit, and the third switch operates on the basis of an output voltage of the voltage adjustment unit.

7. The solar cell panel array according to claim 4, further comprising:
a DC voltage device connected to the third switch in parallel; and
a rectifying device connected between the third switch and the DC voltage device.

8. The solar cell panel array according to claim 3, wherein a heat sink is formed on a surface of the case cover.

9. The solar cell panel array according to claim 8, wherein the heat sink is made of heat sink fins.

* * * * *